US011849392B2

(12) United States Patent
Lou et al.

(10) Patent No.: US 11,849,392 B2
(45) Date of Patent: Dec. 19, 2023

(54) PROCEDURES AND MECHANISMS FOR NARROWBAND MULTI-CHANNEL TRANSMISSION FOR WAKE UP RADIOS

(71) Applicant: INTERDIGITAL PATENT HOLDINGS, INC., Wilmington, DE (US)

(72) Inventors: Hanqing Lou, Syosset, NY (US); Xiaofei Wang, Cedar Grove, NJ (US); Oghenekome Oteri, San Diego, CA (US); Alphan Sahin, Westbury, NY (US); Li-Hsiang Sun, San Diego, CA (US); Rui Yang, Greenlawn, NY (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 121 days.

(21) Appl. No.: 16/610,994

(22) PCT Filed: May 7, 2018

(86) PCT No.: PCT/US2018/031351
§ 371 (c)(1),
(2) Date: Nov. 5, 2019

(87) PCT Pub. No.: WO2018/204908
PCT Pub. Date: Nov. 8, 2018

(65) Prior Publication Data
US 2020/0178171 A1    Jun. 4, 2020

Related U.S. Application Data

(60) Provisional application No. 62/595,901, filed on Dec. 7, 2017, provisional application No. 62/555,497, filed
(Continued)

(51) Int. Cl.
*H04W 52/02* (2009.01)
*H04W 28/16* (2009.01)
*H04W 84/12* (2009.01)

(52) U.S. Cl.
CPC ....... *H04W 52/0216* (2013.01); *H04W 28/16* (2013.01); *H04W 84/12* (2013.01)

(58) Field of Classification Search
None
See application file for complete search history.

(56) References Cited

U.S. PATENT DOCUMENTS 7,423,990 B2    9/2008 Kelton et al.
9,241,307 B2    1/2016 Merlin et al.
(Continued)

FOREIGN PATENT DOCUMENTS

WO    2017/052596 A1    3/2017

OTHER PUBLICATIONS

Kim et al., "SFD MAC proposal," IEEE 802.11-17/0379r1 (Mar. 13, 2017).
(Continued)

*Primary Examiner* — Hassan A Phillips
*Assistant Examiner* — Gautam Sharma
(74) *Attorney, Agent, or Firm* — Volpe Koenig

(57) ABSTRACT

Procedures and mechanisms for narrowband multi-channel transmission for wakeup radio (WUR) operation are disclosed. A station (STA) operating in WUR mode may have its a primary connectivity radio (PCR) turned off and its WUR turned and operating according to previously negotiated WUR operating parameters. The STA may monitor, for WUR beacons and frames over a first WUR channel, and determine that the first WUR channel does not support reliable transmission based on no beacons being received within a first duration. The STA may turn off the WUR, and
(Continued)

turn on the PCR to send a first short WUR frame including a wakeup reason, and receive a second short WUR frame with a WUR channel assignment. The STA may turn off the PCR, turn on the WUR, and monitor for WUR signals on a second WUR channel according to the WUR channel assignment and the previously negotiated WUR operating parameters.

20 Claims, 15 Drawing Sheets

Related U.S. Application Data on Sep. 7, 2017, provisional application No. 62/502,336, filed on May 5, 2017.

(56) References Cited

U.S. PATENT DOCUMENTS

| | | | |
|---|---|---|---|
| 9,351,250 B2 | 5/2016 | Jafarian et al. | |
| 10,499,335 B2* | 12/2019 | Huang | H04W 52/0216 |
| 2013/0235720 A1* | 9/2013 | Wang | H04W 52/0216 |
| | | | 370/229 |
| 2014/0050133 A1 | 2/2014 | Jafarian et al. | |
| 2016/0374019 A1* | 12/2016 | Park | H04L 5/0053 |
| 2017/0026907 A1 | 1/2017 | Min et al. | |
| 2017/0280498 A1* | 9/2017 | Min | H04L 5/0053 |
| 2017/0324443 A1* | 11/2017 | Turner | H04W 74/0816 |
| 2018/0020501 A1* | 1/2018 | Aboul-Magd | H04W 76/28 |
| 2018/0049130 A1* | 2/2018 | Huang | H04W 56/001 |
| 2018/0092036 A1* | 3/2018 | Azizi | H04L 5/0064 |
| 2018/0103430 A1* | 4/2018 | He | H04W 48/16 |
| 2018/0234918 A1* | 8/2018 | Asterjadhi | H04W 52/0229 |
| 2018/0242248 A1* | 8/2018 | Huang | H04W 52/028 |
| 2018/0255515 A1* | 9/2018 | Gupta Hyde | H04W 88/08 |
| 2018/0279224 A1* | 9/2018 | Yang | H04W 52/028 |
| 2018/0288703 A1* | 10/2018 | Sun | H04W 52/0229 |
| 2019/0191376 A1* | 6/2019 | Kim | H04W 52/0229 |
| 2019/0230581 A1* | 7/2019 | Hwang | H04W 48/10 |
| 2019/0246351 A1* | 8/2019 | Yang | H04W 52/0216 |
| 2019/0253972 A1* | 8/2019 | Park | H04W 84/12 |
| 2019/0327672 A1* | 10/2019 | Hwang | H04L 5/0048 |
| 2020/0015166 A1* | 1/2020 | Ahn | H04W 52/0235 |
| 2020/0100182 A1* | 3/2020 | Yun | H04L 27/02 |

OTHER PUBLICATIONS

Lim et al., "Consideration on WUR Frame Structure," IEEE 802.11-17/0036r2 (Jan. 15, 2017).
Wang et al., "Power Consumption Evaluation for a Few WUR MAC Procedures," IEEE 802.11-17/1065r1 (Jul. 10, 2017).
Aboul-Magd, "802.11 HEW SG Proposed PAR;" IEEE 802.11-14/0165r0 (Jan. 22, 2014).
Aboul-Magd, "802.11 HEW SG Proposed PAR," IEEE 802.11-14/0165r1 (Mar. 17, 2014).
Aboul-Magd, "IEEE 802.11 HEW SG Proposed CSD," IEEE 802.11-14/0169r0 (Jan. 22, 2014).
Aboul-Magd, "IEEE 802.11 HEW SG Proposed CSD," IEEE 802.11-14/0169r1 (Mar. 18, 2014).
Azizi et al., "A PAR Proposal for Wake-up Radio," IEEE 802.11-16/1045r06, (Jul. 2015).
Azizi et al., "Wake-Up Receiver Usage Scenarios and Applications," IEEE 802.11-16/xxxxr0 (IEEE 802.11-16/0974r0) (Jul. 2016).
Guo et al., "Initial Thoughts on High Level MAC Procedures," IEEE 802.11-17/0354r2 (Mar. 2017).
Huang et al., "High Level MAC Concept for WUR," IEEE 802.11-17/0071r0 (Jan. 2017).
Huang et al., "WUR Action Frame Format Follow up," IEEE 802.11-17/1627r2 (Nov. 2017).
IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, IEEE P802.11ad-2012 (Dec. 2012).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (Tvws) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
Kim et al., "Channel Issue in WUR," IEEE 802.11-17/0031r0 (Jan. 2017).
Kim et al., "Initial Negotiation for WUR," IEEE 802.11-17/0070r0 (Jan. 2017).
Kim et al., "Initial Negotiation for WUR," IEEE 802.11-14/1342r1 (Jan. 2017).
Kim et al., "SFD MAC proposal," IEEE 802.11-17/0379r0 (Mar. 13, 2017).
Kim et al., "WUR Channel Switch," IEEE 802.11-17/0380r0 (Mar. 16, 2017).
Liu et al., "Assign and Update Wake-Up Signals in WLAN with Wake-Up Radio Receivers," IEEE 802.11-17/0435r0 (Mar. 10, 2017).
Huang et al., "WUR Beacon," IEEE 802.11-17/0343r3 (Mar. 12, 2017).

* cited by examiner

PROCEDURES AND MECHANISMS FOR NARROWBAND MULTI-CHANNEL TRANSMISSION FOR WAKE UP RADIOS

CROSS REFERENCE TO RELATED APPLICATIONS

This application is the U.S. National Stage, under 35 U.S.C. § 371, of International Application No. PCT/US2018/031351 filed May 7, 2018, which claims the benefit of U.S. Provisional Application No. 62/502,336, filed May 5, 2017, U.S. Provisional Application No. 62/555,497, filed Sep. 7, 2017, and U.S. Provisional Application No. 62/595,901, filed Dec. 7, 2017, the contents of which are hereby incorporated by reference herein.

BACKGROUND

Fixed or low mobility wireless communication for local area networks (LANs) utilize technologies such as the Institute of Electrical and Electronics Engineers (IEEE) 802.11a, 802.11b, 802.11g, 802.11n, 802.11ac, 802.11ax, or generally 802.11x, also generally referred to as WiFi. These technologies relate to medium access control (MAC) and physical layer (PHY) specifications for creating wireless LANs (WLANs) between at least two points. With the growth of WLANs, it may be desirable to transmit signals in the same transmission for a number of types of WLAN interfaces to achieve desired performance and spectral efficiency.

SUMMARY

Mechanisms for narrowband multi-channel transmission for wakeup radio (WUR) operation are disclosed. A station (STA) may turn off its primary connectivity radio (PCR) and operate its WUR according to previously negotiated WUR operating parameters. The STA may monitor for WUR beacons and WUR frames over a first WUR channel. The STA may determine and set a wakeup reason to "the WUR channel may not support reliable transmission" based on the WUR not successfully receiving beacons within a first duration. The STA may turn off the WUR, and turn on the PCR to send a first short WUR frame including the wakeup reason, and receive a second short WUR frame with a WUR channel assignment. The STA may turn off the PCR, turn on the WUR, and monitor for WUR signals on a second WUR channel according to the WUR channel assignment and the previously negotiated WUR operating parameters.

BRIEF DESCRIPTION OF THE DRAWINGS

A more detailed understanding may be had from the following description, given by way of example in conjunction with the accompanying drawings wherein.

DETAILED DESCRIPTION

Figure 1A:
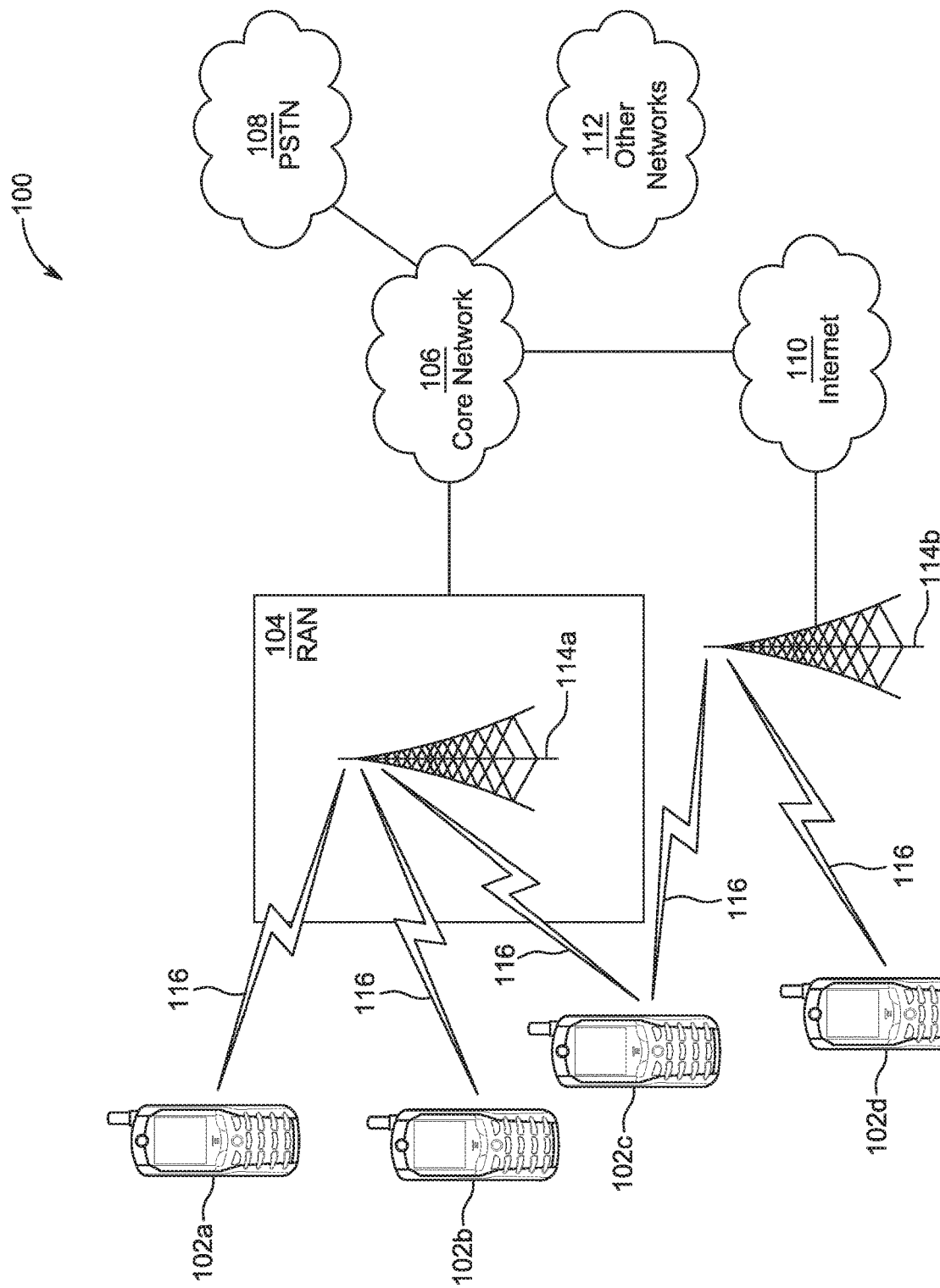
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless/wired transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
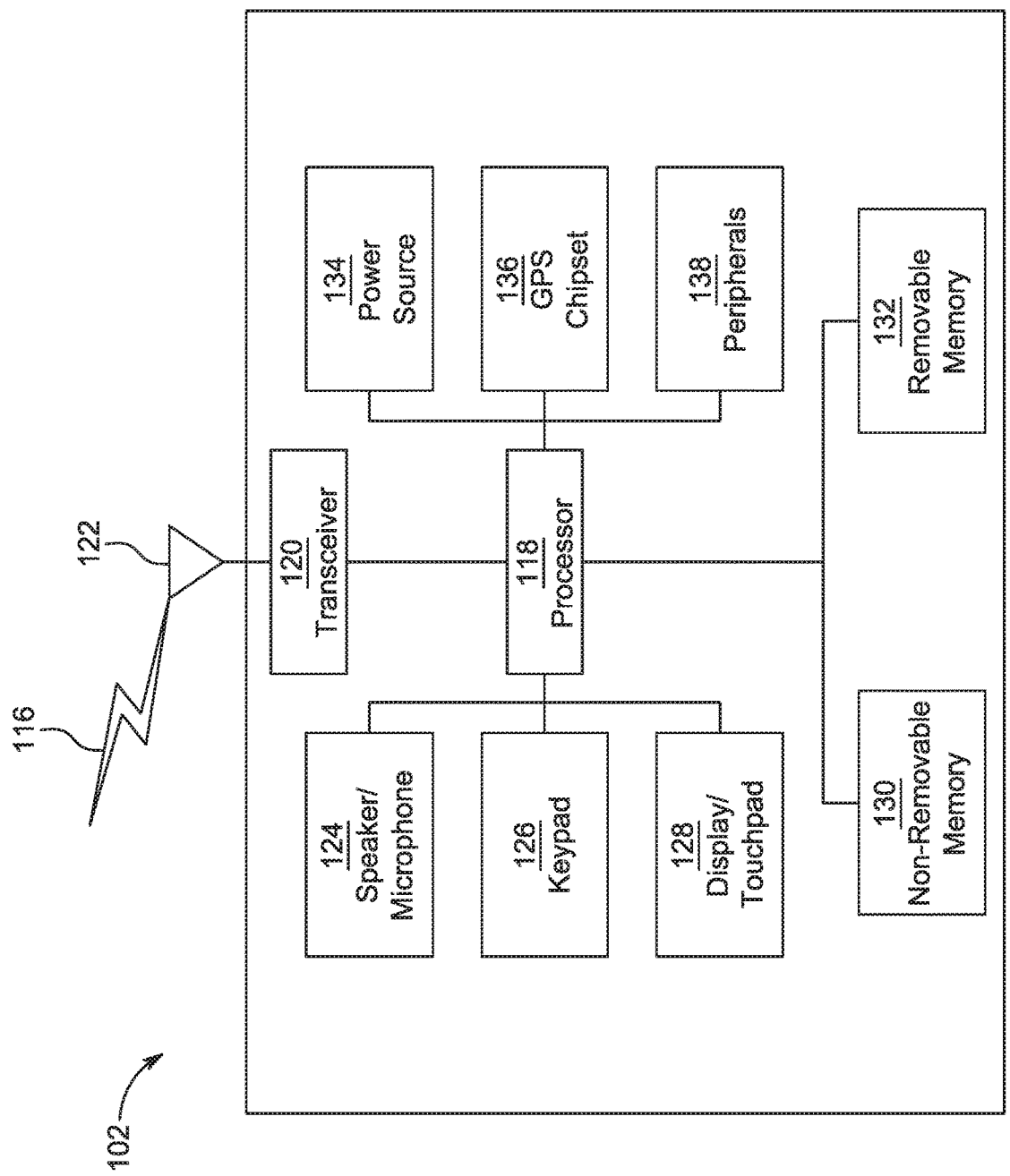
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
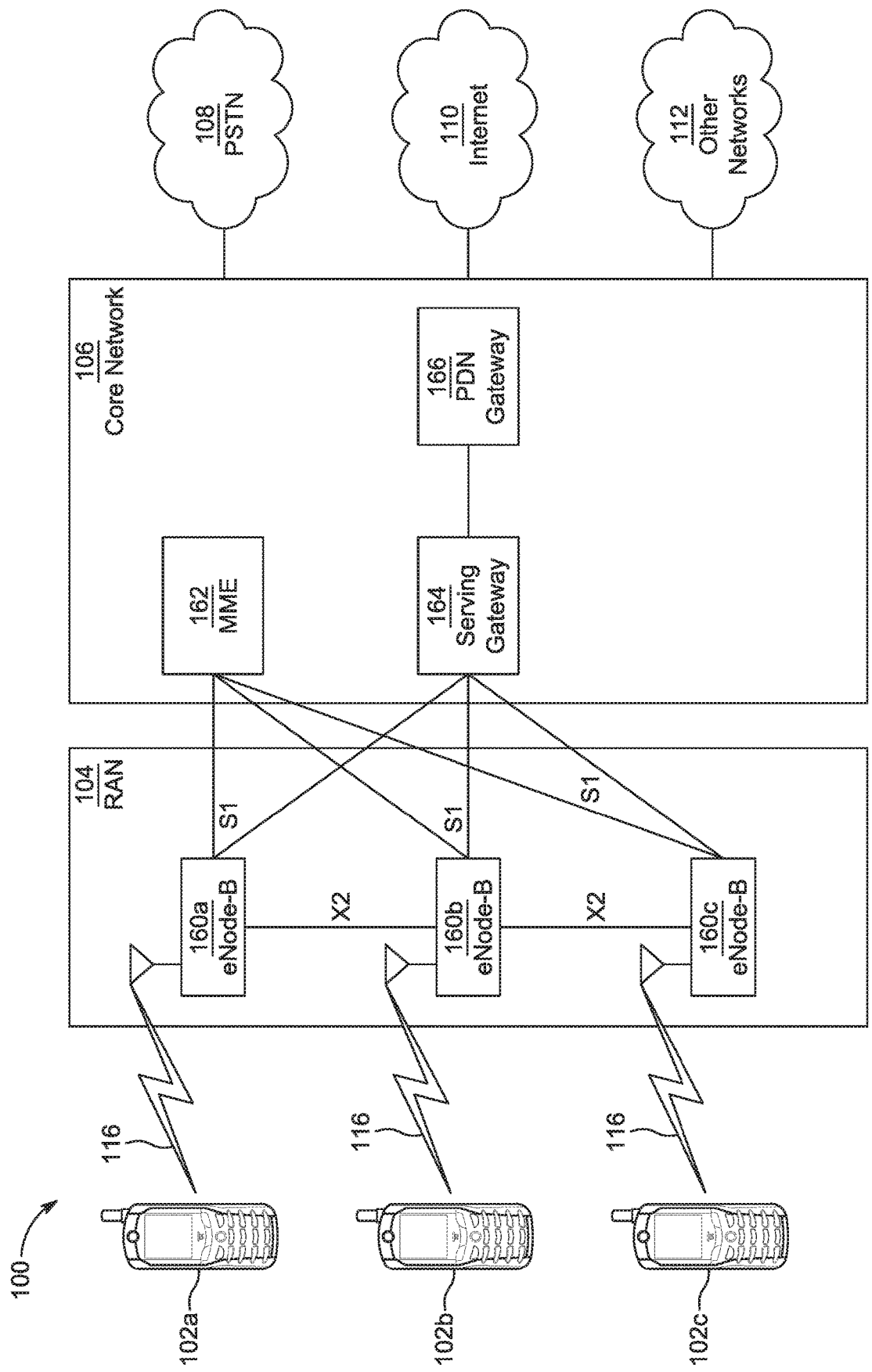
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80-80 configuration. For the 80-80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80-80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remain idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11 ah is 6 MHz to 26 MHz depending on the country code.

Figure 1D:
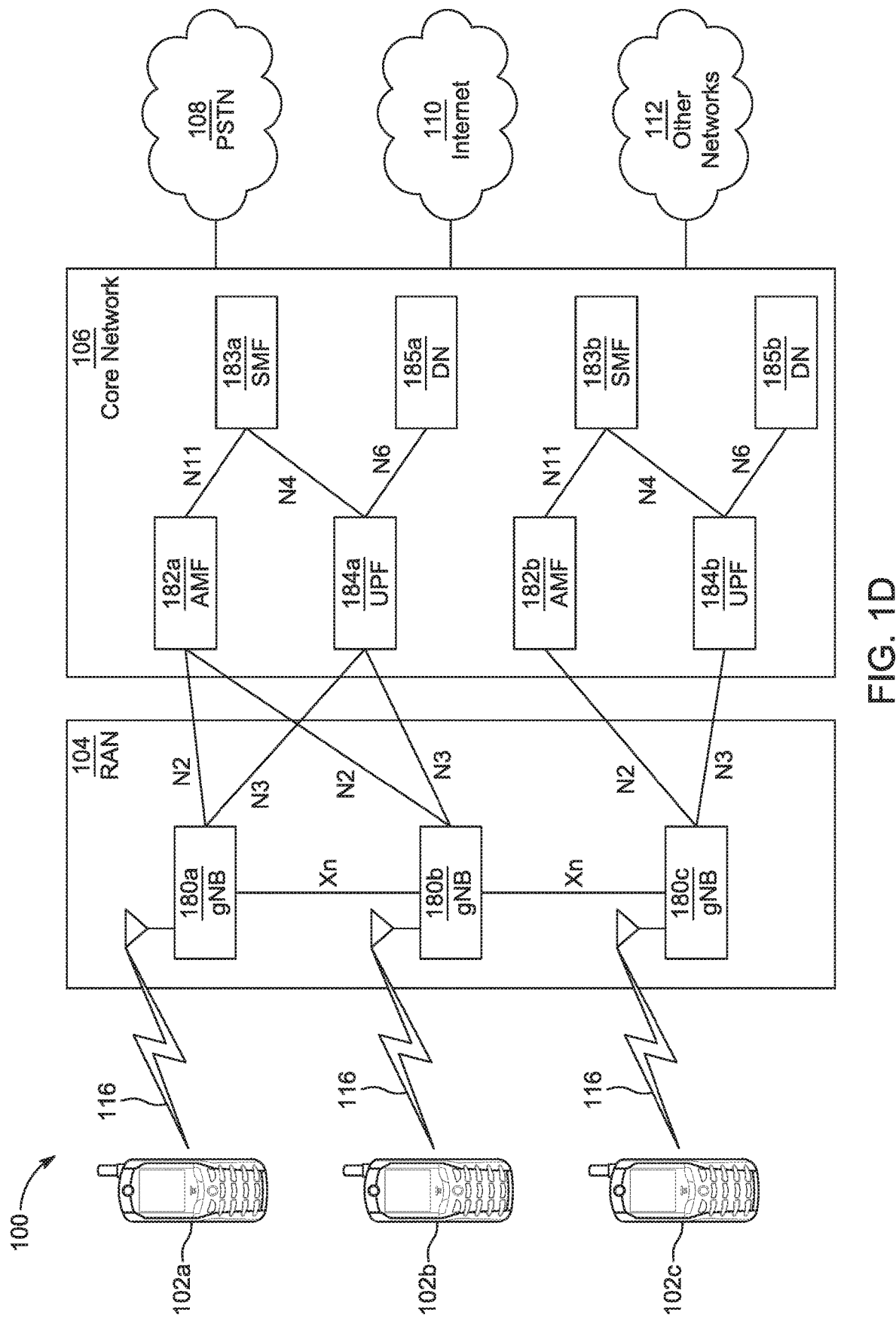
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a,184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. The AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

The IEEE 802.11 High Efficiency WLAN (HEW) Study Group (SG) was created to explore enhancements to the quality of service (QoS) experienced by different types of wireless users in many usage scenarios including high-density scenarios in the 2.4 GHz and 5 GHz bands. For example, the HEW SG may consider use cases that support dense deployments of APs, STAs, and associated radio resource management (RRM) technologies. Example applications for HEW may include usage scenarios such as data delivery for stadium events and other high user density scenarios (e.g., train stations, enterprise/retail environments), video delivery, and wireless services for medical applications.

The IEEE 802.11ax Task Group (TG) (TGax), approved by the HEW SG, has investigated and measured traffic for a variety use case scenarios and found that a variety of applications may have a high likelihood for short packets and certain network applications may generate short packets. Example of network applications that may generate short packets include, but are not limited to, the following applications: virtual office, transmit power control (TPC) acknowledgement (ACK), video streaming ACK, device/controller (e.g., mice, keyboards, game controls), access probe request/response, network selection probe requests and ANQP, and/or control frames for network management. The 802.11ax standard may support multi-user (MU) features, such as uplink (UL) and/or downlink (DL) OFDMA and/or UL and/or DL MU-MIMO, that may benefit from UL multiplexing including UL random access multiplexing.

The IEEE 802.11ba Wake Up Radio (WUR) SG was created to explore and develop PHY and MAC protocols to provide enhanced low power operations of 802.11 devices. The operating frequency bands for 802.11ba WUR may include 2.4 GHz and/or 5 GHz and may be extended to sub 1 GHz. In an example of 802.11ba WUR, an 802.11 device may be equipped with a WUR and a primary connectivity radio (PCR). APs and/or non-AP STAs may have a WUR as a companion radio to a PCR. The PCR may be used to transmit and receive regular 802.11 packets (e.g., in accordance with 802.11ac, 802.11af, 802.11ah, 802.11n, and/or 802.11ax) and the WUR may operate as a low-power companion radio to the PCR. The WUR may have a coverage range that is at least the same as the range of the PCR operating on at least a 20 MHz payload bandwidth. Herein, PCR may be referred to interchangeably as the main radio, the primary radio, the 802.11 radio, the WiFi radio, or the primary transmission radio (PTR), and packet, frame, signal, signaling and message may be used interchangeably. Herein, sleep, doze or WUR mode (or state) may refer to the STA operating with its PCR turned off and/or its WUR turned on, such that less power is used to run the WUR than the PCR. A STA operating in WUR mode and receiving with the WUR a wakeup packet may trigger or cause the corresponding PCR to wake up from a sleep state and power on. Herein, specific types of interframe spacing (IFS) may be given as examples; however, any other type of IFS (e.g., reduced IFS (RIFS)) or any other time interval may be applied in the examples described herein.

In an example, the WUR may transmit and/or receive packets that carry control information. In an example, the WUR in a STA may be a one-directional radio that is configured to receive messages, such as messages containing control information. The WUR may communicate over a narrowband channel (i.e., with a narrow frequency bandwidth) and/or may have active receiver power consumption below 1 milliWatt (mW). In an example, an AP may operate on a 20 MHz PCR channel, such that the 20 MHz PCR channel may include (i.e., within the 20 MHz frequency band) a 4 MHz WUR channel allocated for WUR operation with a WUR-enabled WTRU(s). In another example, an AP may operate on a 20 MHz PCR channel, such that the 20 MHz PCR channel may include and it more than one non-overlapping 4 MHz WUR channel allocated for WUR operation with a WUR-enabled WTRU(s). In another example, an AP may operate on a 80 MHz PCR channel, such that each 20 MHz PCR channel (within the 80 MHz channel) may include a 4 MHz WUR channel (for a total four 4 MHz WUR channels) allocated for WUR operation with a WUR-enabled WTRU.

Example applications of 802.11ba WUR may include, but are not limited to, the following applications: IoT devices, low power operation for smart phones, quick message/incoming call notification scenarios, quick status query/report applications, configuration change scenarios, and/or quick emergency/critical event report scenarios.

Figure 2:
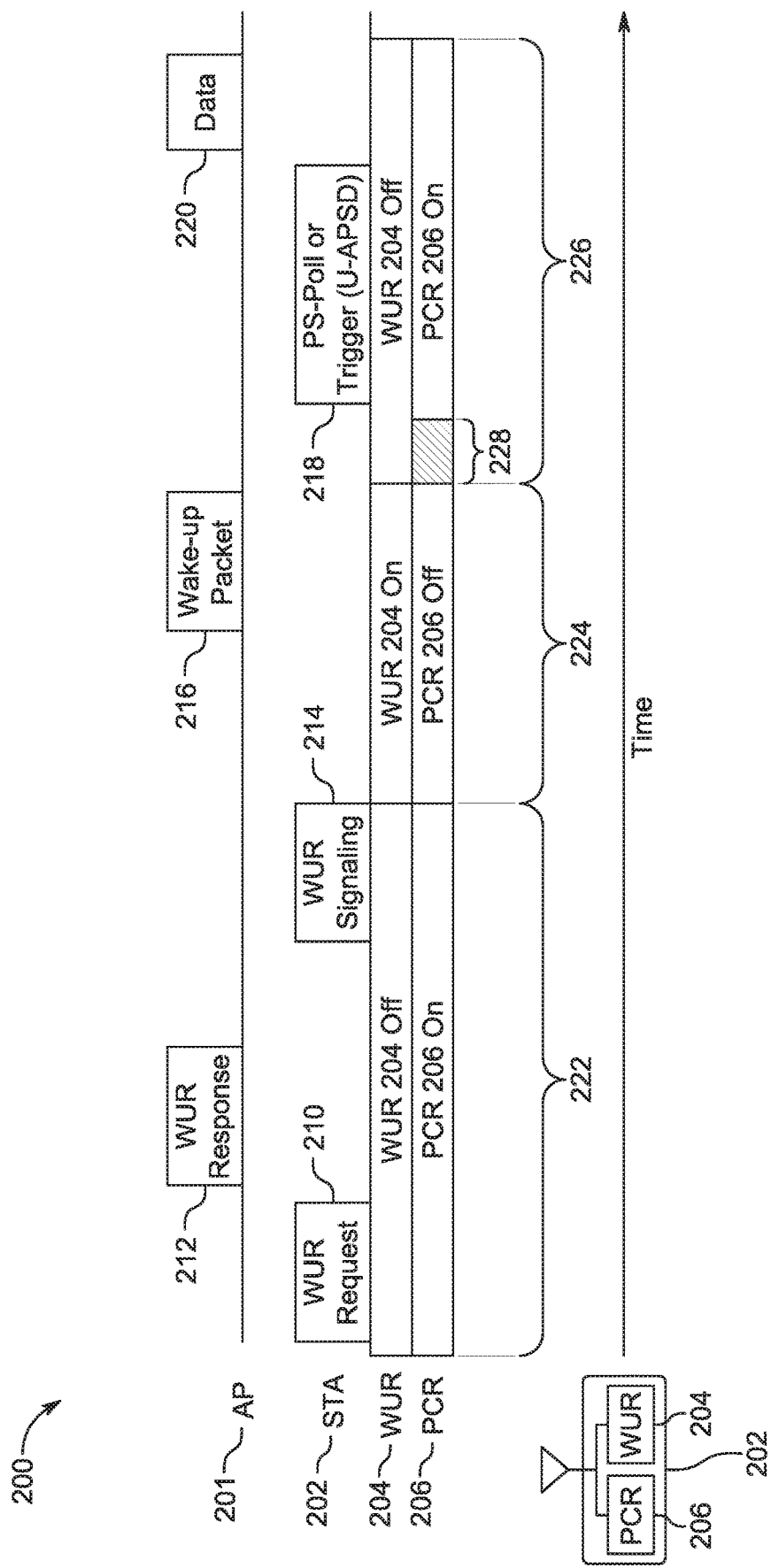
FIG. 2 is a signaling diagram of an example wakeup radio (WUR) negotiation procedure between an AP and a STA equipped with a WUR and a PCR.

FIG. 2 is a signaling diagram of an example WUR negotiation procedure 200 between an AP 201 and a STA 202, where the STA 202 is equipped with a WUR 204 and a PCR 206 (the STA 202 may include other components not shown, including any of the WTRU 102 components shown in FIG. 1B). The PCR 206 may include a transceiver and may be an 802.11 radio operating in accordance with 802.11 protocols such as 802.11n and/or 802.11ax. The WUR 204 may include a transceiver or a receiver in the case that the WUR 204 is configured for communication in one direction (i.e., reception). Example scenarios in which a WUR negotiation procedure 200 may be performed include, but are not limited to, the following scenarios: frequency band and channel negotiation; STA identifier (ID) allocation in a wakeup packet; indication of required time for turning on the 802.11 radio (i.e., PCR 206); and/or indication of periodic WUR 204 receiver on/off schedule. WUR mode field(s) or element(s) may be defined to provide information for WUR operation including, but not limited to, WUR setup information, WUR channel information, WUR identity (ID), WUR duty cycle, and time duration information for hopping or switching between the PCR 206 and the WUR 204. The WUR mode field(s) carrying WUR information may be included in any of the WUR negotiation frames (e.g., WUR request frame 210, WUR response frame 212, WUR signaling frame 214) and/or any other control or management frames (not shown), such as beacon frame, (re)association frames, and/or probe request/response frames.

The following time periods are shown in the example WUR negotiation procedure 200: period 222 during which the WUR 204 is off and the PCR 206 is on; period 224 during which the STA 202 is in a low power or WUR mode where the WUR 204 is on and the PCR 206 is off; and period 226 during which the WUR 204 is off and the PCR 206 is on. During period 222, the STA 202 may send, using PCR 206, a WUR request message 210 to the AP 201. The STA 202 may receive, with the PCR 206, a WUR response message 212 from the AP 201 which may include an indication that the STA 202 is authorized to use WUR operating mode. The STA 202 may send, using PCR 206, WUR signaling 214 (e.g., one or more messages) to the AP 201 to notify the AP 201 that the STA 202 is entering the WUR state and will be using WUR 204 and turning off PCR 206. During period 224, the STA 202 is in a low power WUR state such that PCR 206 is off and the STA 202 may communicate with the AP 201 using WUR 204. In an example, the WUR 204 may operate in a one-directional mode such that the WUR 204 may receive packets from the AP 201 and may not be used to transmit packets. During period 224 while PCR 206 off, the STA 202 may receive, using the WUR 204, a wakeup packet 216 from the AP 201 notifying the STA 202 to turn on PCR 206. In response to the wakeup packet 216, the STA 202 in period 226 may turn on PCR 206 (for example e.g., after a processing delay 228) and turn off WUR 204. During period 226, the STA 202 may exchange messages with the AP 201. For example, the STA 202 may send, to the AP 201, a power save poll (PS-Poll) and/or trigger frame(s) 218 and may receive, from the AP 201, data frame(s) 220.

In an example, a STA (e.g., AP or non-AP STA) that supports WUR may use the PCR to communicate 802.11 signals over a wideband channel(s) and use the WUR to communicate WUR signals over narrowband channel(s). For example, an 802.11 signal may have a bandwidth of 20 MHz, 40 MHz, 80 MHz, 80+80 MHz, and 160 MHz. In contrast, the bandwidth of WUR signal may be 4 MHz or 5 MHz. The 802.11 signal may be transmitted on a wideband channel that may or may not partially overlap with a WUR transmission signal. In comparison to wideband transmission, narrowband transmission may be more vulnerable to channel fading. Thus, a STA that is experiencing deep channel fading may have difficulty receiving the WUR signal even if the STA is in a close proximity to the transmitting STA (e.g., AP). Accordingly, narrowband WUR transmissions may benefit from additional protection to channel fading.

In an example, WUR narrowband multi-channel transmission may be supported. For example, an AP may operate on one 802.11 wideband channel (e.g., a 20 MHz channel) while supporting multiple non-overlapping narrowband WUR channels (e.g., 4 WUR channels at 5 MHz each). An AP may use any of the following example methods to transmit multiple WUR signals on multiple WUR channels concurrently. In an example, one WUR channel (from among multiple concurrent WUR channels) may be defined as a WUR primary channel and WUR beacons/synchronization signals may be transmitted over the WUR primary channel. All the WUR STAs may monitor the WUR primary channel in order to receive the WUR beacons/synchronization signals. In another example, one WUR channel may be defined as a primary WUR channel and WUR beacons/synchronization signals may be transmitted some or all the WUR channels (i.e., not just the WUR primary channel). In another example, no WUR primary channel may be defined and WUR beacons/synchronization signals may be transmitted over any or all of the WUR channels.

Figure 3A:
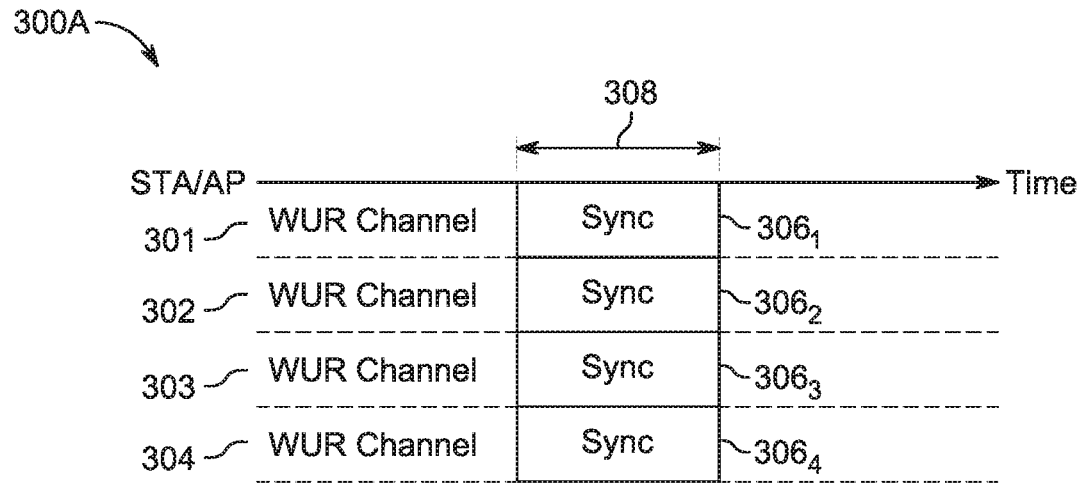
FIG. 3A is a signaling diagram of an example beacon/synchronization signaling procedure and 300B with multiple WUR channels.
Figure 3B:
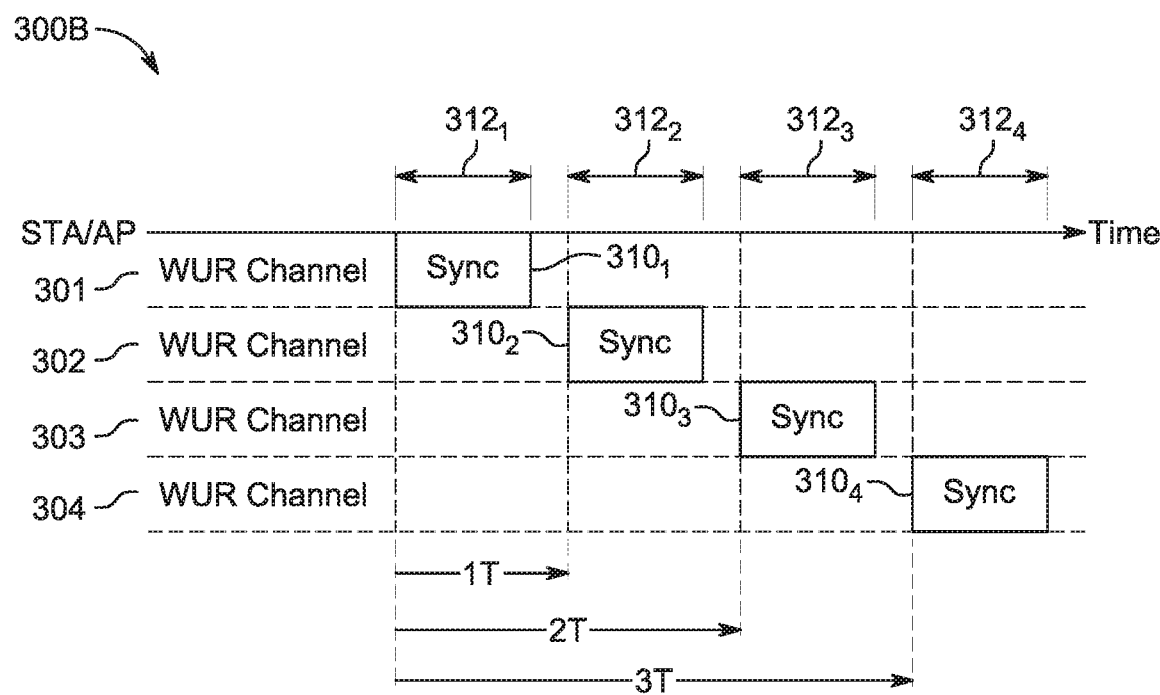
FIG. 3B is a signaling diagram of another example beacon/synchronization signaling procedure and 300B with multiple WUR channels.

FIGS. 3A and 3B are signaling diagrams of example beacon/synchronization signaling procedures 300A and 300B with multiple WUR channels 301, 302, 303 and 304. Example beacon/synchronization signaling procedures 300A and 300B may involve WUR beacon/synchronization signals transmitted on all WUR channels 301-304. According to example synchronized beacon/synchronization signaling procedure 300A, WUR beacon/synchronization frames $306_{1\ldots4}$ may be transmitted concurrently on channels 301-304 in a synchronized format, and the WUR beacon interval 308 may be the same for all WUR channels 301-304. According to example offset beacon/synchronization signaling procedure 300B, WUR beacon frames $310_{1\ldots4}$ may be transmitted on channels 301-304 with a fixed offset. For example, beacon/synchronization frame $310_2$ on WUR channel 302 may be transmitted 1T offset duration after the transmission of beacon/synchronization frame $310_1$ on WUR channel 301. Beacon/synchronization frame $310_3$ on WUR channel 303 may be transmitted 2T offset duration after the transmission of the beacon/synchronization frame $310_1$ on WUR channel 301. Beacon/synchronization frame $310_4$ on WUR channel 304 may be transmitted 3T offset duration after the transmission of the beacon/synchronization frame $310_1$ on WUR channel 301. The WUR beacon intervals $312_{1\ldots4}$ may have the same duration on all WUR channels 301-304.

According to an example, an AP may transmit beacon/synchronization frames over multiple channels (e.g., a WUR primary channel may or may not be used) and WUR channel switching or WUR channel hopping may be used during WUR operation. WUR channel switching may include the STA renegotiating WUR channels and/or WUR channel parameters with AP each time the STA switches WUR channels. For WUR channel hopping, the STA may change or hop between WUR channels according to a channel hopping pattern where the AP and STA already have information on the upcoming WUR channels. Examples of WUR channel switching and WUR channel hopping are described in detail below.

Figure 4:
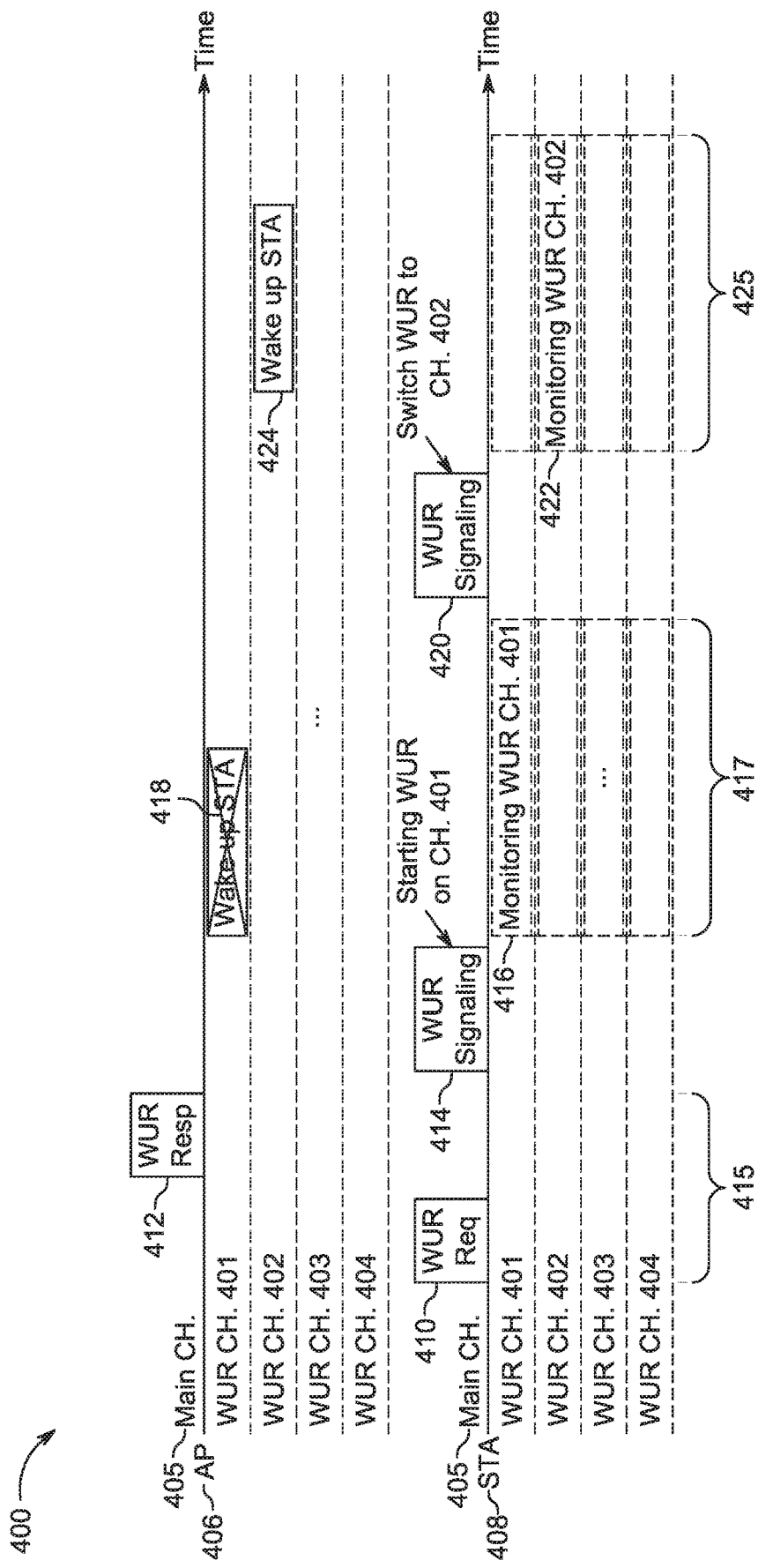
FIG. 4 is a signaling diagram of an example WUR channel switching procedure.

FIG. 4 is a signaling diagram of an example WUR channel switching procedure 400. In the example of FIG. 4, the AP 406 may transmit beacon/synchronization frames (not shown) over multiple WUR channels 401-404, for example during a WUR channel setup period 415, and/or during WUR channel monitoring periods 417 and 425. The WUR channels 401-404 may or may not include a WUR primary channel. During the WUR channel setup period 415, the AP 406 and the STA 408 may exchange WUR setup information (e.g., WUR beacon/synchronization signal information, WUR duty cycle information, WUR channel information, and/or WUR rate information).

A STA 408 may transmit, to its associated AP 406, a WUR request frame 410 on a main channel 405 that may be associated with the main operation radio (e.g., PCR). The WUR request frame 410 may indicate the intent of STA 408 to enter a doze or sleep mode on the main channel 405 (i.e., by turning off the main radio/PCR) and to start monitoring at least one WUR channel 401-404 (using one or more WURs). In the WUR request frame 410, the STA 408 may indicate a preferred WUR channel(s) among multiple WUR channels 401-404. For example, the STA 408 may indicate to the AP 406 a preferred channel index, a WUR channel list in preference order, and/or a channel quality report for each WUR channel 401-404 in WUR request frame 410. For example, the channel quality report may include signal-to-noise ratio (SNR), signal-to-interference-plus-noise ratio (SINR), or received signal strength indicator (RSSI) measured on each WUR channel. In an example, a main 802.11 channel (e.g., of 20 GHz) may be composed of WUR channels 401-404, such that measurements for each WUR channel 401-404 (e.g., 4 GHz each with guard band removed) may be made using the main radio by measuring a signal transmitted on the main 802.11 channel comprising the WUR channels 401-404.

The STA 408 may detect and receive a WUR response frame 412 from the AP 406 on the main channel 405 (over the main radio). In an example, the WUR response frame 412 may be received IFS (e.g., xIFS) time after the WUR request frame 410. The WUR response frame 412 may indicate a WUR channel assigned to the STA 408 (e.g., WUR channel 401). The WUR response frame 412 may indicate a WUR start time indicating the time the STA 408 may switch to the WUR (e.g., the time may be set to x_duration before a WUR beacon/synchronization frame, no shown, where x_duration may be a small duration to allow the STA 408 to switch from main radio to the WUR radio). The WUR response frame 412 may indicate other operating WUR channels by the AP 406 (e.g., any of WUR channels 401-404).

The WUR response frame 412 may indicate a WUR beacon interval or synchronization signal periodicity. The WUR response frame 412 may indicate a maximum monitoring duration before the STA 408 switches WUR channels. For example, if the STA 408 does not observe any valid WUR transmission on the assigned WUR channel 401 during a maximum monitoring duration (e.g., equal to monitoring period 417), then the STA 408 may try to switch to a different WUR channel (e.g., from WUR channel 401 to WUR channel 402). In another example, the maximum monitoring duration before switching may be or predetermined and may not be signaled by the AP 406. The WUR response frame 412 may indicate the maximum monitoring duration before the STA 408 switches back to the main radio (PCR)/main channel 405 from a WUR channel (e.g., WUR channel 401). For example, if STA 408 does not observe any valid WUR transmission on WUR channel 401 during the maximum monitoring duration, the STA 408 may try to switch back to the main channel 405/main radio. In another example, the maximum monitoring duration before switching may be or predetermined and may not be signaled by the AP 406. The WUR response frame 412 may indicate the WUR STA ID (e.g., for WUR channel 401) assigned to the STA 408.

The STA 408 may transmit a WUR signaling frame 414 over the main channel 405, which may indicate the reception of WUR Response frame 412 and may indicate that the STA 408 is switching from the main radio to the WUR after transmitting the WUR signaling frame 414. In an example, The STA 408 may transmit the WUR signaling frame 414 an IFS time (e.g., yIFS) after the receiving the WUR response frame 412. In an example not shown, the STA 408 may transmit the WUR signaling frame 414 in a separate transmission opportunity (TXOP) from the TXOP during which WUR request/response exchange (e.g., at a later time). The WUR signaling frame 414 may include an indication that the STA 408 will switch off the main radio from the end of the transmission of the WUR signaling frame 414. The WUR signaling frame 414 may include an indication that the STA 408 will switch off the main radio at a time indicated by the AP 406 as the WUR start time. The WUR signaling frame 414 may include an indication for the STA 408 to switch on the WUR from the end of the WUR signaling frame 414 transmission. The WUR signaling frame 414 may include an indication for the STA 408 to switch off the main radio in the time indicated by the AP 408 as the WUR start time. The WUR signaling frame 414 may include the WUR channel index and/or the WUR channel ID of the channel that the STA 408 will be operating on (e.g., for WUR channel 401).

Following the WUR signaling 414, the STA 408 may switch on the WUR and/or switch off the main radio (e.g., from the end of WUR signaling frame 414 transmission or at a time indicated by the AP 408 as the WUR start time). The STA 408 may monitor 416 one or more assigned WUR channel(s) 401-404 (e.g., assigned WUR channel 401). For example, the STA 408 may monitor 416 WUR channel 401 for a maximum monitoring duration. If the STA 408 does not observe any valid transmission from AP 406 during the maximum monitoring duration (e.g., AP 406 does not transmit a wakeup STA packet 418 during the maximum monitoring duration equal to the monitoring period 417), the STA 408 may transmit a WUR switching frame 420 to switch to a different WUR channel (e.g., from WUR channel 401 to WUR channel 402). The WUR switching frame 420 may carry the current WUR index/ID (e.g., for WUR channel 401), and WUR index/ID to be used (e.g., for WUR channel 402).

In order to transmit the WUR switching frame 420, the STA 408 may turn on the main radio, and transmit the WUR switching frame 420 over the main radio/main channel 405 after monitoring the main channel 405 for a predetermined or time duration. The STA 408 may perform enhanced distributed channel access (EDCA) backoff before the main radio transmission of WUR switching frame 420. In order to reduce the power consumption over the main radio, the STA 408 may use EDCA parameters of a higher priority access category to transmit WUR switching frame 420 over the main channel 405. For example, the WUR switching frame 420 may be sent using a certain access category, such as AC_VI or AC_VO. The AP 406 may modify the EDCA access parameters by changing the EDCA parameter set element in a beacon frame, probe response frame, and (re)association response frame (not shown). In an example, the WUR switching frame 420 may be a WUR request frame. The STA 408 may wait for the AP 406 to respond with a WUR response frame 412 over the main channel 405, and then transmit another WUR signaling frame 420. The AP 406 and STA(s) 408 may use the WUR request and response frame exchange to negotiate the WUR channel to be used, such that the STA 408 may use the agreed upon WUR channel (e.g., WUR channel 402).

In another example not shown, the STA 408 may determine the identity of the operating WUR channels from a previous WUR request/response frame exchange from which the STA 408 may determine the WUR channel (e.g., WUR channel 401 or 402) the WTRU should use for monitoring and/or switching. The STA 408 may transmit information indicating the selected WUR channel(s) to the AP 406 over the main channel 405. Then the STA 406 may switch to monitoring the WUR channel as selected and indicated by the STA 406.

In another example not shown, the STA 408 may transmit the WUR switching frame 420 over a currently assigned WUR channel (e.g., WUR channel 401) to the AP 408. For example, the STA 408 may wait for the AP 406 to respond over the current WUR channel 401. Then the STA 408 may switch to a new WUR channel (e.g., WUR channel 402). In another example, the STA 408 may switch to a new WUR channel 402 after the STA 408 transmits the WUR switching frame 420 over the current WUR channel 401 prior to the switch. Once the STA 408 switches to the new WUR channel 402, the STA 408 may transmit a WUR switching channel frame (not shown) over the new WUR channel 402 to inform the AP 406 about the WUR channel switch. The STA 406 may expect to receive a confirmation from the AP 408 on the new WUR channel 402.

Once STA 408 completes the switch to WUR channel 402, STA 408 may monitor 422 WUR channel 402 for a duration (e.g., the maximum monitoring duration) and may receive a wakeup STA frame 424 from the AP 406, for example. In another example not shown, the STA 408 may continue monitoring the current WUR channel 401 without switching WUR channels even if no frames are received by the STA 408 while monitoring 416 WUR channel 401 for the maximum monitoring duration.

In an example of an AP-driven WUR trigger procedure, an AP may initiate a WUR request/response exchange with one or more STAs. For example, the AP trigger WUR mode when any one or more of the following conditions are met: when the AP determines that the STA(s) are capable of WUR transmission; when the AP determined that the STA(s) intend to switch to WUR mode of operation to save power; and/or when the AP does not have buffered data for the STA(s).

For an AP driven WUR trigger procedure, the AP may transmit a WUR Trigger frame to one or more STAs over the main radio. The WUR trigger frame may carry the WUR operation channels, WUR start time, and/or WUR channel assignment for the STA(s). The WUR trigger frame may be the same as the WUR response frame. On reception of the WUR trigger frame, a STA may check whether it is an intended recipient of the WUR trigger frame (e.g., if the STA is identified in the WUR trigger frame). If the STA is an intended recipient, then the STA may check whether it intends to turn on its WUR radio and/or switch off its main radio. The STA may transmit a WUR signaling frame (e.g., using a trigger based PPDU) if the WUR trigger frame is requested or allowed. In the case that the WUR trigger frame is transmitted to multiple STAs, multiple STAs may reply simultaneously using an OFDMA transmission. In each of the WUR signaling frames transmitted by the STA(s), the STA(s) may indicate whether it will switch off the main radio and/or start using the WUR. The WUR channel index on which the STA may monitor may be included in the WUR signaling frame. Other elements of an AP driven WUR trigger procedure may be similar to the elements for the WUR STA procedure, such as those elements described above and with respect to FIG. 4.

Figure 5:
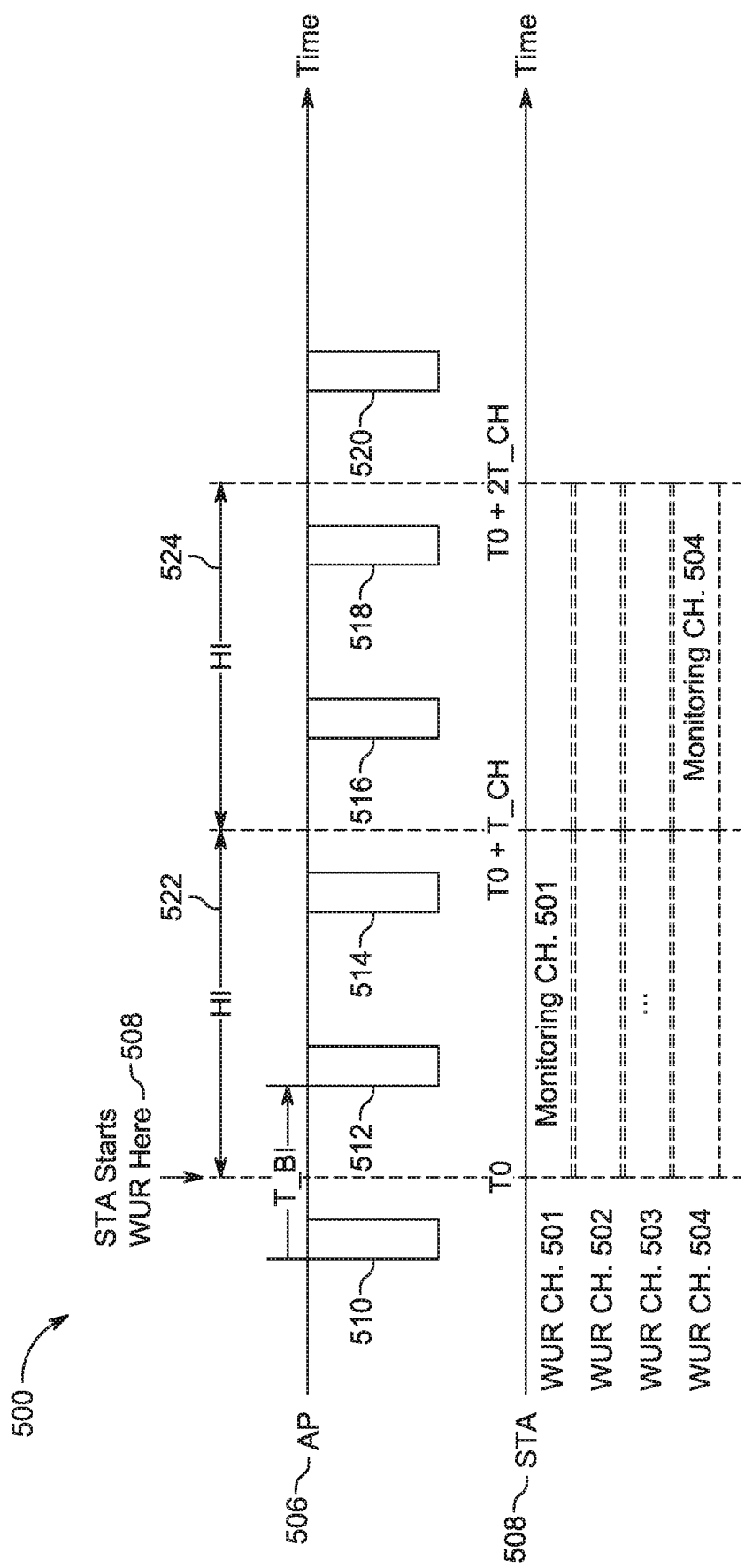
FIG. 5 is a signaling diagram of an example WUR channel hopping procedure.

In an example, WUR channel hopping may be used as part of WUR operation. FIG. 5 is a signaling diagram of an example WUR channel hopping procedure 500. In the example WUR channel hopping procedure 500 of FIG. 5, the AP 506 may transmit beacon/synchronization frames 510, 512, 514, 516, 518, 520 over one or more WUR channels 501, 502, 503, 504. The WUR channels 501, 502, 503, 504 may or may not include a primary channel. FIG. 5 shows a WUR beacon interval duration, $T_{BI}$, and a WUR channel hopping duration, $T_{CH}$, which may be the duration for a STA 508 to monitor a particular or assigned WUR channel. For example, the STA 508 may monitor WUR channel 501 from time T0 to time T0+$T_{CH}$ and may monitory WUR channel 504 from time T0+$T_{CH}$ to time T0+2$T_{CH}$. The WUR channel hopping duration $T_{CH}$ may be in units of number of beacon interval durations $T_{BI}$, for example.

WUR channel hopping intervals (HIs), HI 522 and HI 524, may be defined as intervals between [t, t+T_CH], where t may be equal to a WUR start time (e.g., T0 for HI 522 WUR channel 501), or an offset from the WUR start time (e.g., T0+$T_{CH}$ for HI 524 and WUR channel 504). N may be an integer that represents the number of channel hops performed during the channel hopping interval HI 522. $T_{SW}$ may be the switching time for the STA 508 to hop from one WUR channel to another WUR channel, and may be equal to or greater than 0. In the case that extra signaling is transmitted to inform of the WUR channel switching, the signaling time may be included in the switching time $T_{SW}$. In an example, the start time t for a WUR channel hopping interval HI may be generally defined by Equation 1:

$$t=T0+N*T_{CH}+N*T_{SW} \qquad \text{Equation 1}$$

Figure 6:
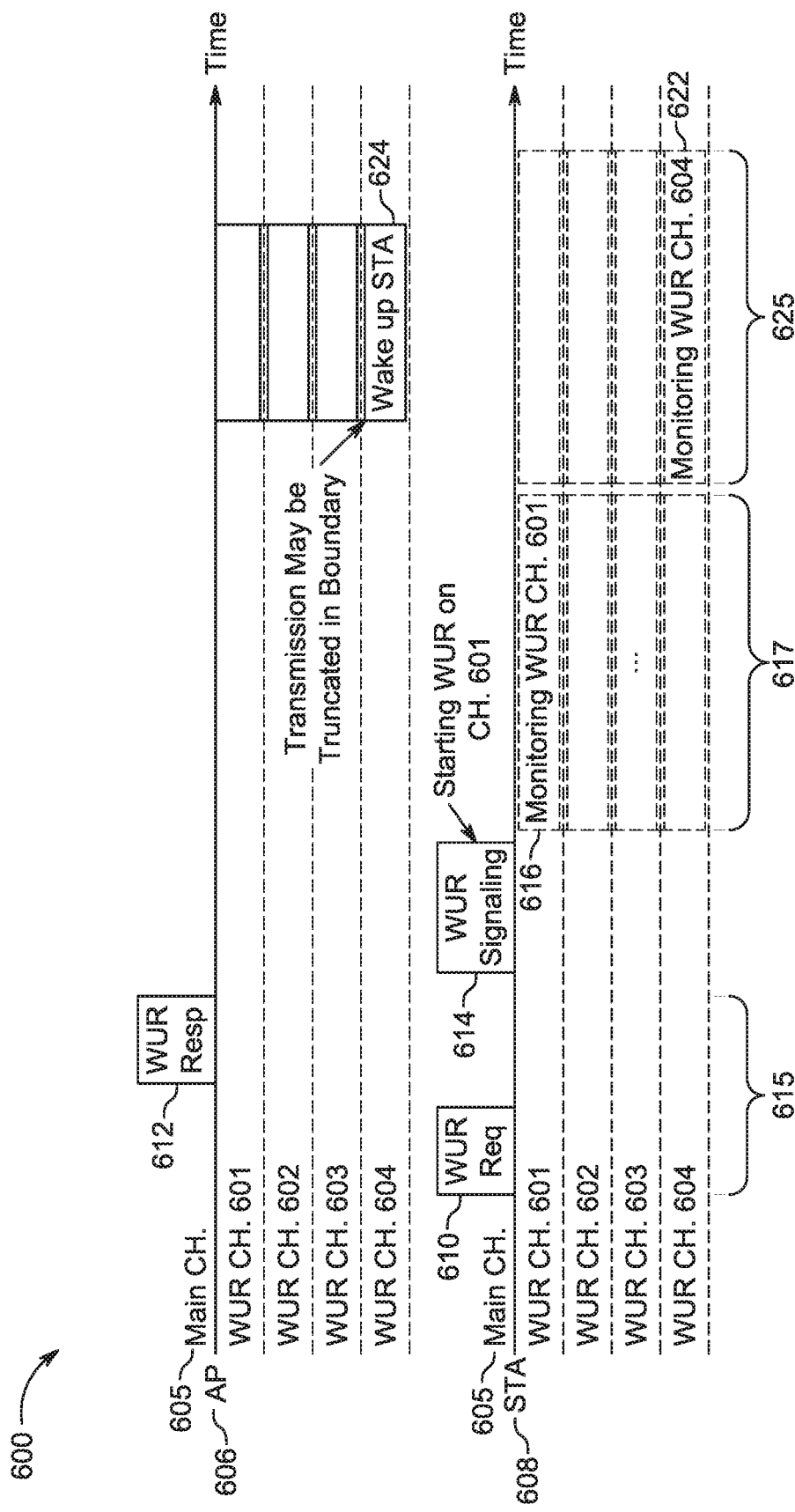
FIG. 6 is a signaling diagram of another example WUR channel hopping procedure.

FIG. 6 is a signaling diagram of an example WUR channel hopping procedure 600. The AP 606 may transmit beacon/synchronization frames (not shown) over multiple WUR channels 601-604, for example during a WUR channel setup period 615. The WUR channels 601-604 may or may not include a WUR primary channel.

A STA 608 may transmit, to its associated AP 606, a WUR request frame 610 on a main channel 605 that may be associated with the main operation radio (e.g., PCR). The WUR request frame 610 may indicate the intent of STA 608 to enter a doze mode on the main channel 605 (i.e., by turning off the main radio/PCR) and start monitoring at least one WUR channel 601-604 (using one or more WURs). In the WUR request frame 610, the STA 608 may indicate a preferred WUR channel(s) among multiple WUR channels 601-604. For example, the STA 608 may send a preferred channel index, a WUR channel list in preference order, and/or a channel quality report for each WUR channel 601-604. The channel quality report may include SNR, SINR, or RSSI measured on each WUR channel 601-604.

The STA 608 may detect and receive a WUR response frame 612 from the AP 606 on the main channel 605 (over the main radio). In an example, the WUR response frame 612 may be received an IFS (e.g., xIFS) time after the WUR request frame 610. The WUR response frame 612 may indicate a WUR channel hopping pattern to the STA 608. In an example, the first WUR channel in the WUR channel hopping pattern (e.g., WUR channel 601) may be used for the STA 608 as the first WUR channel to monitor. The WUR channel hopping pattern may go through all the available WUR channels operated by the AP 606. For example, the AP may operate four WUR channels 601-604, and the hopping pattern may indicate the hopping order as [601, 604, 603, 602]. In another example, the WUR channel hopping pattern may go through a selected subset of the WUR channels 601-604. For example, the hopping pattern may be [601, 604, 603] such that WUR channel 602 may not be used by the STA 608. The WUR channel down-selection may depend on the WUR channel quality report and user density on each WUR channel 601-604. The WUR channel quality report may be explicitly provided to the AP 606 from the STA(s) 608 or may be implicitly acquired through bi-directional communication.

The WUR response frame 612 may indicate a starting WUR channel, which may be a field that indicates the WUR channel that the STA 608 switches to after the WUR request/response exchange between the AP 606 and the STA 608. In an example, a starting WUR channel field may not be included in the WUR response frame 612 and the WUR starting channel may be determined from the WUR channel hopping pattern. The WUR response frame 612 may indicate a WUR hopping periodicity or WUR hopping duration ($T_{CH}$). A WUR hopping periodicity or duration field may indicate the time duration for the STA 608 to monitor (remain on) a WUR channel. The WUR response frame 612 may indicate a WUR start time. A WUR start time field may indicate the time at which the STA 608 should switch to a WUR channel. For example, the WUR start time may be set to x_duration before a WUR beacon/synchronization frame, where x_duration may be a small duration to allow the STA 608 time to switch from the main radio to the WUR radio. The WUR response frame 612 may indicate the WUR beacon interval or synchronization signal periodicity ($T_{BI}$). The WUR response frame 612 may indicate the maximum monitoring duration. The maximum monitoring duration field may be in units of beacon intervals (BI) or hopping intervals (HI). In an example, the maximum monitoring duration may be long enough to cover the channel hopping over all of the WUR channel candidates (e.g., WUR channels 601-604). The WUR response frame 612 may indicate the WUR STA ID (e.g., for WUR channel 601) assigned to the STA 608.

The STA 608 may transmit a WUR signaling frame 614 over the main channel 605, which may indicate the reception of WUR Response frame 612 and may indicate that the STA 608 is switching from the main radio to the WUR after transmitting the WUR signaling frame 614. In an example, The STA 608 may transmit the WUR signaling frame 614 an IFS time (e.g., yIFS) after the receiving the WUR response frame 612. In an example not shown, the STA 608 may transmit the WUR signaling frame 614 in a separate TXOP from the TXOP during which the WUR request frame 610 and WUR response exchange 612 are exchanged. The WUR signaling frame 614 may include an indication that the STA 608 will switch off the main radio from the end of the transmission of the WUR signaling frame 614. The WUR signaling frame 614 may include an indication that the STA 608 will switch off the main radio at a time indicated by the AP 606 as the WUR start time. The WUR signaling frame 614 may include an indication for the STA 608 to switch on the WUR from the end of the WUR signaling frame 614 transmission. The WUR signaling frame 614 may include an indication for the STA 608 to switch off the main radio in the time indicated by the AP 608 as the WUR start time. The WUR signaling frame 614 may include the WUR channel index and/or the WUR channel ID of the channel that the STA 608 will operating on (e.g., for WUR channel 601).

Following the WUR signaling 614, the STA 608 may switch on the WUR and/or switch off the main radio (e.g., from the end of WUR signaling frame 614 transmission or at a time indicated by the AP 608 as the WUR start time). The STA 608 may monitor 616 the WUR channel on the WUR channel hopping list (e.g., WUR channel 601) for the WUR HI 617. If the STA 608 observes one or more WUR beacon/synchronization frames during the WUR HI 617, the STA 608 may adjust its timer based on a timing synchronization function (TSF) or partial TSF defined in the WUR beacon/synchronization frames. If a WUR packet (e.g., a WUR beacon/synchronization frame) arrives during the boundary of two HI (e.g, HI 617 and HI 625), the STA 608 may continue receiving the WUR packet over the WUR channel that it is currently monitoring (e.g., WUR channel 601), and then switch to the next WUR channel (e.g., WUR channel 604 in HI 625) after the reception of the WUR packet. This may cause a delay in channel hopping, however the delay may not impact the HI partition. In an example, the start time t for a WUR channel hopping interval HI (e.g., the start time for HI 617 and HI 625) may be defined by Equation 1.

In the example WUR channel hopping procedure 600, the STA 608 may monitor WUR channel 601 during HI 617, and then the STA 608 may hop to next WUR channel 604, as defined by the WUR channel hopping pattern. Once STA 608 completes hopping to WUR channel 602, STA 608 may monitor 622 WUR channel 604 for a duration HI 625 (e.g., which may be equal to the maximum monitoring duration) and may receive a wakeup STA frame 624 from the AP 406 during HI 625. In an example, if the wakeup STA frame 624 is expected to cross the HI 625 time boundary, then the wakeup STA frame 624 may be truncated to fit in the current HI 625. In an example not shown, if the STA 608 does not receive any valid transmissions during a maximum monitoring duration during HI 625, the STA 608 may switch on its main radio and/or associate with a new AP that is different from AP 606.

Figure 7:
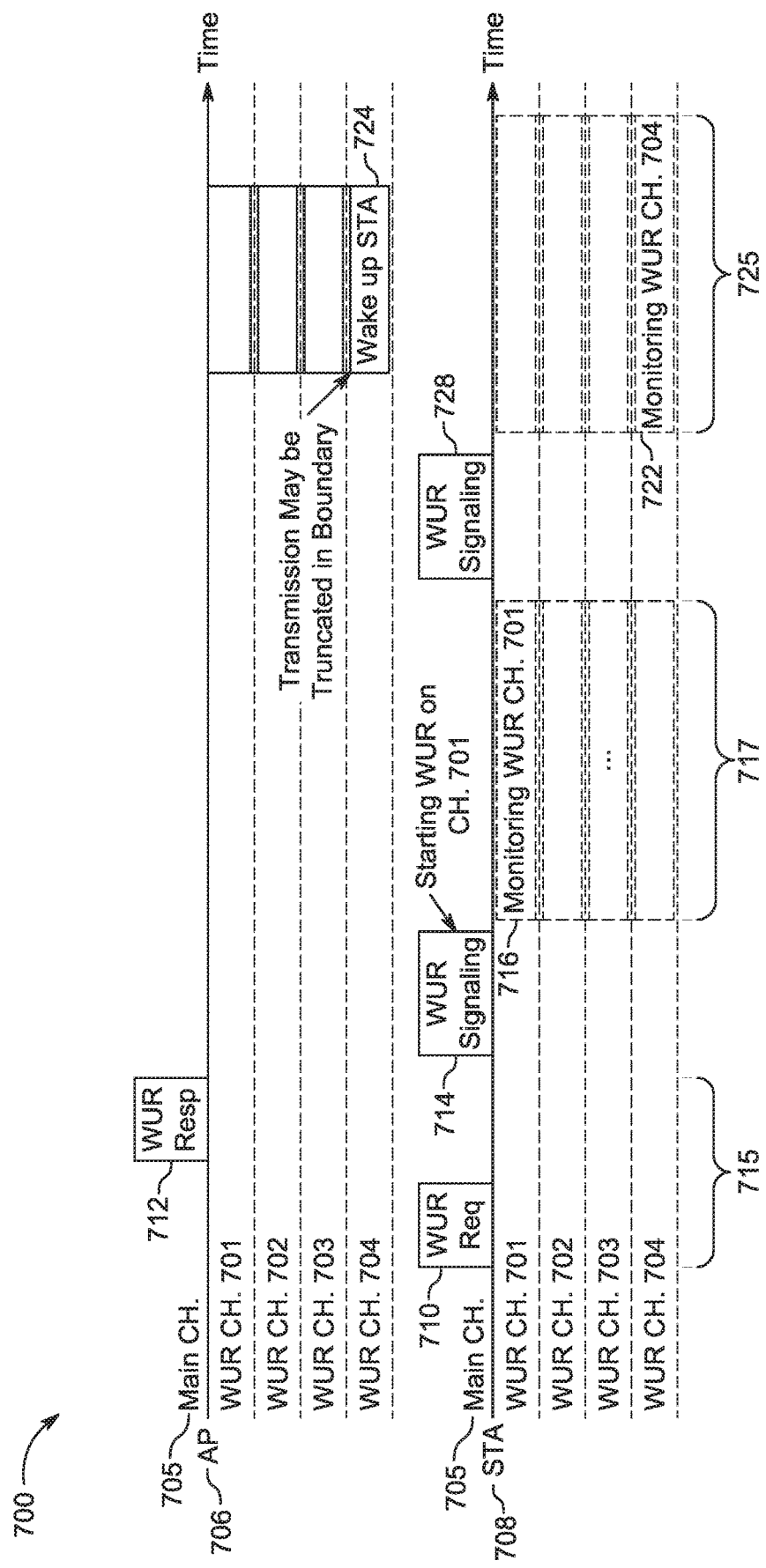
FIG. 7 is a signaling diagram of another example WUR channel hopping procedure.

FIG. 7 is a signaling diagram of another example WUR channel hopping procedure 700. The example WUR channel hopping procedure 700 may operate similarly to the example WUR channel hopping procedure 600; in particular, WUR channel setup period 715, the WUR request 710/response 712 exchange, WUR signaling 714, WUR channel monitoring 716 on WUR channel 701 for a duration/HI 717, WUR channel monitoring 722 on WUR channel 704 for a duration/HI 725, and AP 706 sending wakeup STA packet 724 to STA 708 may be similar to the equivalent signaling and monitoring described in example WUR channel hopping procedure 600 of FIG. 6. However, the example WUR channel hopping procedure 700 of FIG. 7 may further include a step where the STA 708 may switch to the main radio and main channel 705 in between HI 717 and HI 725 in order to transmit WUR switching signaling 728 and then switch back to the next WUR channel 704. For example, the WUR switching signal 728 may include the STA ID for the STA 708 that is switching its WUR channel, and/or may indicate the next WUR channel (e.g., WUR channel 704) for STA 708. In an example not shown, the STA 708 may transmit WUR switching signaling 728 over the WUR channel 701 used during the last time slot in the HI 717. In another example not shown, the STA 708 may switch to the next WUR channel 704 to transmit the WUR switching signal 728 over the next WUR channel 704 at the beginning of the next HI 725.

In both WUR channel hopping procedure 600 and 700 of FIGS. 6 and 7, a STA-driven WUR request/response exchange is shown, however an AP-driven WUR negotiation exchange, as disclosed herein, may also be used. For WUR channel hopping and retransmission, an AP may transmit a WUR packet on one of the WUR channels to a STA. If the AP determines that the WUR packet transmission was not successful, it may hold the WUR packet retransmission and wait for channel hopping before retransmitting the packet. The AP may perform WUR retransmission after the STA hops to another WUR channel.

Figure 8:
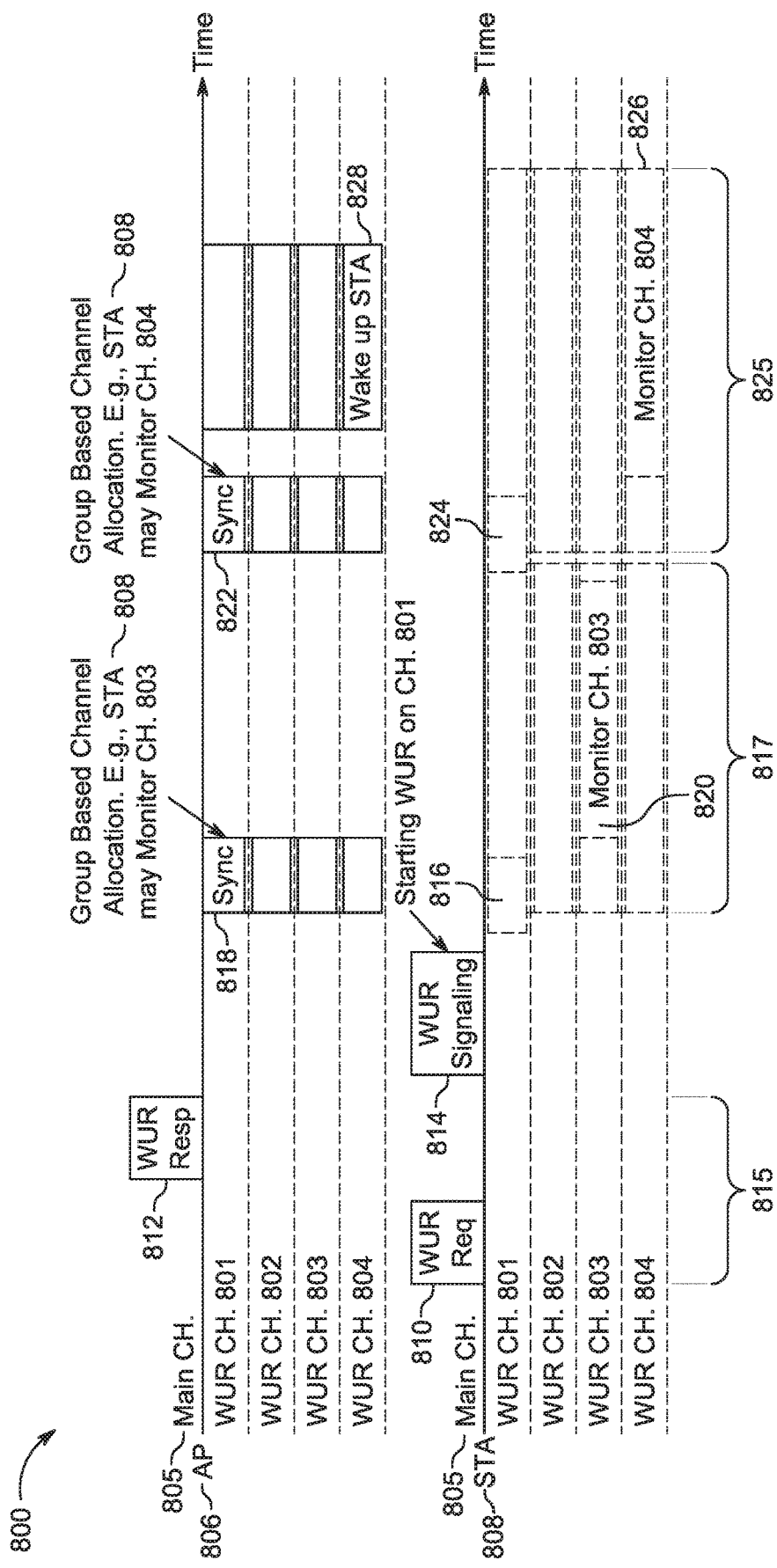
FIG. 8 is a signaling diagram of an example WUR transmission procedure with a primary channel.

Example WUR transmission procedures may employ a primary WUR channel. For example, the primary WUR channel may be defined or selected from among the available WUR channels and beacon/synchronization signals may be transmitted over the primary WUR channel. FIG. 8 is a signaling diagram of an example WUR transmission procedure 800 with a WUR channel 801 functioning as a primary channel. The WUR transmission procedure 800 may begin with the STA 808 transmitting a WUR request frame 810 on the main operation radio and main channel 805 to its associated AP 806 to indicate the STA's 808 intent to go into doze mode on the main channel 805 (i.e., by turning off the main radio PCR) and start monitoring at on at least one WUR channel 801-804. The WUR request frame 810 may indicate the STA's 808 preference from among multiple WUR channels 801-804. For example, the STA 808 may send the preferred WUR channel index, a WUR channel list in preference order, and/or a channel quality report for each WUR channel 801-808. The channel quality may be SNR, SINR, and/or RSSI measured from each WUR (e.g., on the primary channel).

The STA 808 may detect and receive a WUR response frame 812 from the AP 806 on the main channel 805 (over the main radio). In an example, the WUR response frame 812 may be received an IFS (e.g., xIFS) time after the WUR request frame 810. The WUR response frame 812 may indicate a primary WUR channel (e.g., WUR channel 801), for example by WUR channel index or WUR channel ID. The WUR response frame 812 may indicate to the STA 808 any one or more of the following information: an assigned WUR channel (e.g., WUR channel 804); a WUR Start time indicating the time the STA 808 may switch to the WUR (e.g., x_duration before WUR beacon/synchronization frame, where x_duration may be a small duration to allow the STA 808 to switch from main radio to WUR radio); other operating WUR channels; WUR beacon interval or synchronization signal periodicity; and/or the maximum monitoring duration before the STA 808 goes back to the main radio. For the maximum monitoring direction, if the STA 808 does not observe any valid WUR transmission during the maximum monitoring duration, the STA 808 may try to switch back to the main radio (PCR). The maximum monitoring duration may be or predetermined and may not be signaled by the AP 806.

The STA 808 may transmit a WUR signaling frame 814 over the main channel 805, which may indicate the reception of WUR Response frame 812 and may indicate that the STA 808 is switching from the main radio to the WUR after transmitting the WUR signaling frame 814. In an example, The STA 808 may transmit the WUR signaling frame 814 a certain number of IFS time after the receiving the WUR response frame 812. In an example not shown, the STA 808 may transmit the WUR signaling frame 814 in a separate TXOP from the WUR request/response exchange TXOP. The WUR signaling frame 814 may include an indication that the STA 808 will switch off the main radio from the end of the transmission of the WUR signaling frame 814. The WUR signaling frame 814 may include an indication that the STA 808 will switch off the main radio at a time indicated by the AP 806 as the WUR start time. The WUR signaling frame 814 may include an indication for the STA 808 to switch on the WUR from the end of the WUR signaling frame 814 transmission. The WUR signaling frame 814 may include an indication for the STA 408 to switch off the main radio in the time indicated by the AP 808 as the WUR start time. The WUR signaling frame 814 may include the WUR channel index and/or the WUR channel ID of the channel that the STA 808 will be operating on (e.g., for WUR channel 801).

Following the WUR signaling 814, the STA 808 may switch on the WUR and/or switch off the main radio (e.g., from the end of WUR signaling frame 814 transmission or at a time indicated by the AP 806 as the WUR start time). The STA 808 may monitor 816 the WUR primary channel 801. After detecting a beacon/synchronization signal 818 transmitted over WUR primary channel 801, the STA 808 may determine a WUR group (e.g., from a WUR channel allocation element or field that may have been provided in beacon/synchronization signal 818 or WUR response frame 812). The STA 808 may determine its allocated WUR channel(s) (e.g., WUR channel 803) by checking the element/field in the beacon/synchronization signal 818 and/or the WUR response frame 812 that contains a STA ID to WUR channel index (or ID) mapping. After determining the assigned WUR channel 803, the STA 808 may monitor 820 the assigned WUR channel 803 after reception of the WUR beacon/synchronization signal 818.

The STA 808 may switch back to the WUR primary channel 801 for x_duration before the boundary of WUR BI 825. The STA 808 may monitor 824 the WUR primary channel 801 and detect a beacon/synchronization signal 822 transmitted over WUR primary channel 801. The STA 808 may determine its allocated WUR channel(s) (e.g., WUR channel 804) by checking the element/field (e.g., in beacon/synchronization signal 818 and/or 822) that contains the STA ID to WUR channel index (or ID) mapping. After determining the next assigned WUR channel 804, the STA 808 may monitor 826 the assigned WUR channel 804 after reception of the WUR beacon/synchronization signal 822, and may receive a wakeup STA frame 828 from the AP 806 during BI 825. In an example not shown, if the STA 808 does not observe a WUR beacon/synchronization signal over the primary WUR channel 801 during the maximum monitoring duration/BI 825, the STA 808 may switch back to the main radio. The STA 808 may retransmit a WUR report frame, which may indicate that the STA 808 failed to receive a WUR beacon/synchronization signal over the current primary WUR channel 801. In another example not shown, WUR channel assignment for STA 808 may be performed using WUR setup (re)negotiation over the main channel 805, such that the STA 808 may monitor for WUR beacons/synchronization signals over the primary WUR channel 801 to confirm connectivity and acquire timing information.

In an example, the WUR transmission may involve a subset of WUR channels from among a larger set of possible resource units (RUs) and/or subchannels. An AP may define a subset of RUs (and/or subchannels) as the WUR channels for the BSS (which may be referred to as the WUR BSS) of the AP. For example, a subset of the RUs in the primary channel of the AP's BSS may be defined as the set of WUR channels for the AP's BSS. In another example, a subset of RUs (and/or subchannels) of the AP's operating channels may be considered as the set of WUR channels for the BSS. The subset of RUs and/or subchannels may be chosen to minimize correlated fading on each of WUR channel. For example, if a WUR channel is 4 MHz wide, then subchannel 1 and subchannel 3 in the primary 20 MHz channel may be considered as the set of WUR channels for the BSS. In another example, subchannel 1, subchannel 3, channel 5, and channel 7 in the primary 40 MHz channel may be considered as the set of WUR channels for the BSS. In an example, the set of WUR channels may be indicated by the AP to the STA using a bitmap. In an example, the indication of the set of WUR channels may further include an indication a WUR channel width, and/or an indication of the starting frequency or offset in reference to the primary channel.

The indication of the set of WUR channels may be included in an information element (IE), for example in a management, control, data, extension, or null data packet (NDP) frame. For example, the WUR channel set indication may be provided in (short) beacon frames, probe response frames, (re)association response frames, an/or fast initial link setup (FILS) discovery frames. The WUR channel set indication may be included in wakeup STA request and/or wakeup STA response frames.

The WUR channel set indication and WUR channel change procedure may include an AP determining the WUR channel set and including one or more subchannels/RUs (e.g., from the AP's primary channel(s) and/or its operating channels) in the WUR channel set. For example, the AP may indicate to a STA(s) the WUR channel set in (short) beacon, probe response, (re)association response, and/or fast initial link setup (FILS) discovery frames. The STA may send to the AP a WUR request frame prior to the STA going to sleep (i.e., powering off its PCR and turning on its WUR). The WUR request frame may include a set of one or more preferred WUR channels for the STA. The preferred WUR channel set may be determined based on the WUR channel set advertised by the AP and may be a subset of the WUR channel set. In an example, the preferred WUR channel set sent by the STA may include a preference index based on measurements (e.g., SNR, SINR, RSSI) made by the STA on the WUR channels.

The WUR channel change procedure may include the AP, after receiving the preferred WUR channel set from the STA, responding to the STA with a WUR response frame. The WUR response frame may include a preferred WUR channel set that may or may not be the same as the preferred WUR channel set sent by the STA. After receiving the WUR response frame, the STA may go into a doze state (turn off PCR, turn on WUR) and may monitor one or more of the agreed WUR channel set(s). For example, the STA may only monitor the preferred WUR channel set, which may be agreed on by the AP and the STA, or indicated by the AP. The AP may transmit WUR beacon/synchronization signals regularly on one or more of the WUR channels in the WUR channel set(s) that the AP advertised to and/or agreed on with the STA(s) associated with the AP that are currently monitoring the WUR channels. The AP may transmit WUR beacon/synchronization signals on all WUR channels (e.g., subchannels) that are part of the advertised or agreed WUR channel set(s). These transmission of WUR beacon/synchronization signals by the AP may be concurrent or staggered.

The WUR channel change procedure may include a STA, after having not detected any WUR beacon/synchronization signals for a predetermined interval of time (e.g., a Max_Missed_WUR_Beacon_Interval duration), may switch to a next preferred WUR channel (e.g., subchannel) in the agreed WUR channel set. If the STA detects a WUR beacon/synchronization signal on the current WUR channel within the predetermined interval, then the STA may continue to monitor the same WUR channel. The STA may send a WUR packet and/or a PCR packet to alert the AP of its new WUR channel. A WUR packet may simply include a WUR channel index and an identifier of the STA and the identifier for the AP for this purpose. If a WUR beacon/synchronization signal cannot be detected, then the STA may switch to the next preferred WUR channel which is part of the agreed WUR channel set. If a STA failed to detect WUR beacon/synchronization signals on one or more WUR channels that are part of the agreed WUR channel set, then the STA may turn on its primary radio and renegotiate with the AP the WUR channel set, which may contain one or more subchannels or RUs.

In certain scenarios, the STA may request WUR channel sounding by the AP. For example, the STA may request the AP to perform WUR channel sounding if any of the advertised WUR channels (e.g., subchannels) of the WUR channel set are not suitable for the STA. As part of WUR channel sounding, the AP may transmit NDP frames and/or WUR sounding frames concurrently or consecutively over one or more or all available WUR channels. The STA may provide feedback based on the WUR sounding frames transmitted by the AP and received by the STA. The AP may adjust the advertised WUR channel set for the STA and/or the STA may renegotiate with the AP a new agreed upon WUR channel set (e.g., using the WUR request/response frame exchange sequence). In an example, a WUR request frame sent from a STA to the AP may include a sounding request for WUR channels.

Procedures for WUR transmissions may include the use of a WUR trigger frame. The following description of the WUR trigger frame may apply to a WUR response frame, or the WUR response frame described herein may be a WUR trigger frame. The AP may transmit a WUR trigger frame (or WUR response frame), which may carry information about WUR channel operation and assignment. The AP may transmit the WUR trigger frame over the main radio. In an example, the WUR trigger frame may be a unicast frame to one STA. In another example, the WUR trigger frame may be a broadcast or multicast frame to more than one STA. In the case of a multicast frame, the WUR trigger frame may have a trigger frame format and may include a trigger type field/value (e.g., in a common information field) that may be set to a "WUR trigger" type. An example of a WUR trigger frame format (which may also be a WUR response frame format) is shown in Table 1.

TABLE 1

Example WUR trigger frame format

| Frame Control | Duration | RA | TA | Common Info | User Info | ... | User Info | Padding | FCS |
|---|---|---|---|---|---|---|---|---|---|

Fields that may be included in a WUR trigger frame (or response frame) format include, but are not limited to, the following fields: a frame control field that may indicate the frame type is a WUR trigger frame; a duration field that may indicate the duration of the TXOP; a receiver address (RA) field; a transmitter address (TA) field; a common information (info) field; one or more user info fields; padding; and/or frame check sequence (FCS) field for cyclic redundancy check. The RA field may be the address of the STA receiving the WUR trigger frame and may be a group MAC address (e.g., for multiple STAs). The TA field may include the address of the AP/STA transmitting the WUR trigger frame. The common info field may include any one more or more of the following example subfields. For example, the common info field may include a WUR operating channels field and/or a WUR primary operating channels field. The common info field may include a WUR beacon/synchronization mode field, which may indicate whether the WUR beacon/synchronization signal will be transmitted over each WUR channel or the primary WUR channel. The common info field may include a WUR beacon interval or synchronization signal interval field, which may define the periodicity of the WUR synchronization signals. The common info field may include a WUR beacon offset, which may indicate whether a certain offset may be applied over the multiple WUR channels operated by the same AP (e.g., this may be used in scenarios where the WUR beacon/synchronization signal is transmitted over each WUR channel). The common info field may include a WUR channel switching allowed field, which may indicate whether a WUR channel switch is allowed. The common info field may include a WUR channel hopping allowed field, which may indicate whether WUR channel hopping may be allowed. In an example, the WUR channel switching allowed field and/or the WUR channel hopping allowed field may be included in the user Info field of the WUR trigger frame. The common info field may include a maximum monitoring duration, which may be the maximum duration that a STA may monitor a WUR channel before switching or hopping to a different WUR channel, or switching to the main radio.

The user info fields may each include any one more or more of the following example subfields. For example, a user info field may include the association identifier (AID) or WUR_ID identifying the STA in the WUR BSS. A user info field may include a WUR channel assignment field, a WUR channel hopping pattern field, and/or a WUR start time field. The WUR start time field may indicate the time that the STA may switch to the WUR (e.g., the start time may be set to x_duration before a WUR beacon/synchronization frame, where x_duration may be a small duration to allow the STA to switch from the main radio to the WUR).

In some scenarios, a full WUR negotiation procedure between the AP and the STA(s), as described above, may not be used or needed and instead a short WUR negotiation procedure (or short WUR negotiation signaling) may be used, as described in the following. For example, with WUR channel switching operations, the AP and STA may negotiate the use of and settings for WUR channel(s) before the STA enters WUR mode (i.e., while the STA is on the main radio/main channel). Once the STA is in WUR mode operating with the WUR and the main radio turned off (i.e., sleep mode), the STA may wake up its main radio and transmit on the main radio/main channel at intervals to request switching to other WUR channels. At these instances, the AP and STA may not renegotiate the use and/or settings of the WUR channel(s), but may only communicate regarding the next WUR channel for the WUR channel switch. Thus, the information exchanged between the AP and STA in this scenario may be "short" such that only a subset of parameters included in the initial WUR setup negotiation are exchanged, and a short WUR negotiation may be used. Similarly, channel hopping procedures and other WUR negotiation procedures may use the short WUR negotiation, as described below.

In an example, a trigger frame may be used to trigger multiple STAs (multi-STAs) to transmit short WUR signaling. In another example, the STA may transmit short WUR signaling and the AP may reply or respond with short WUR signaling with or without the AP sending a trigger frame. Then, the STA may go back to WUR mode using the updated WUR settings renegotiated using short WUR signaling.

Figure 9:
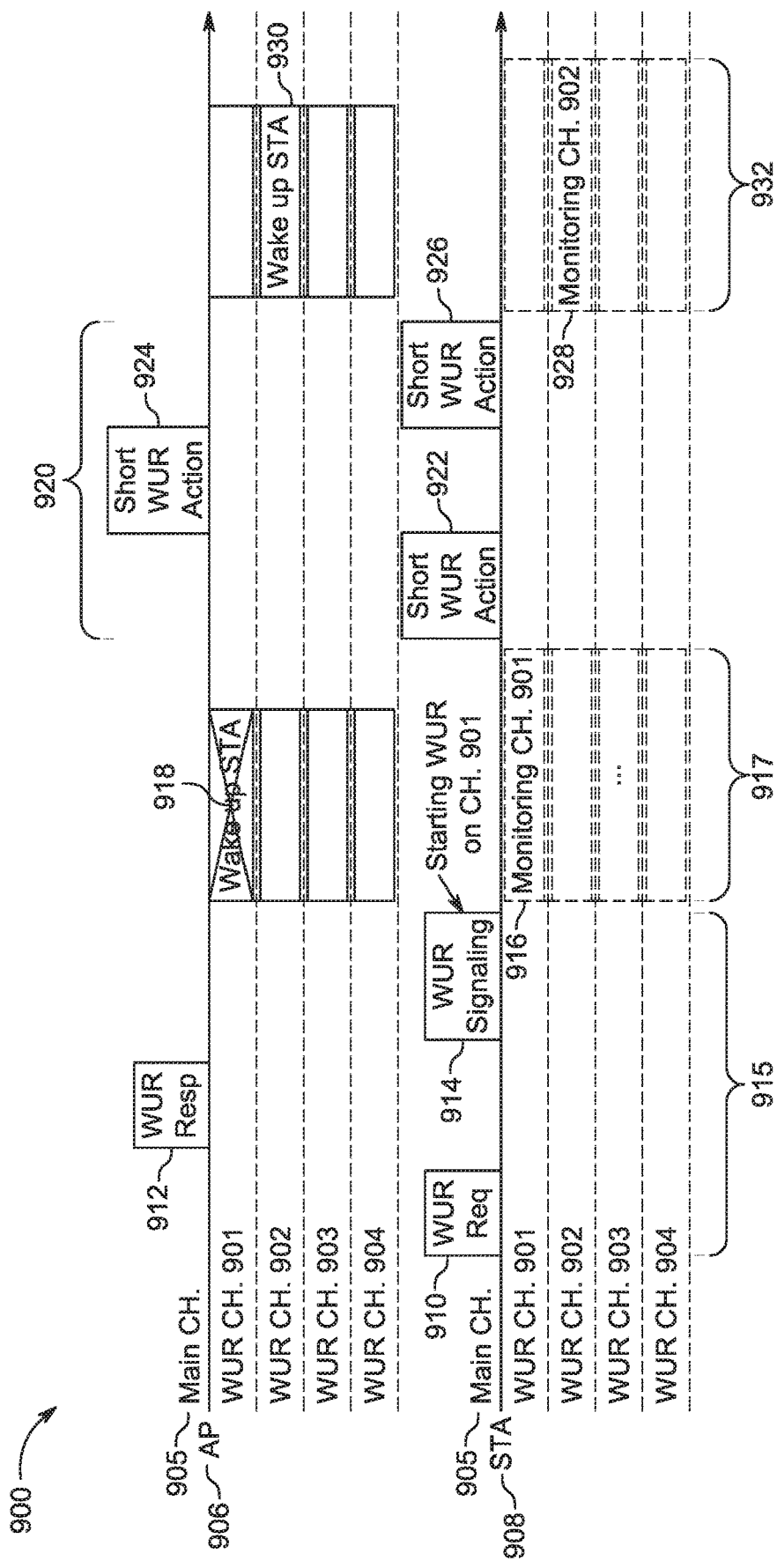
FIG. 9 is a signaling diagram of an example short WUR negotiation procedure using short WUR action frames.

FIG. 9 is a signaling diagram of an example short WUR negotiation procedure 900 using short WUR action frames. The AP 906 and STA 908 may negotiate and exchange WUR setup information during a WUR channel setup period 915, for example via an exchange of WUR request frame 910, WUR response frame 912, and/or WUR signaling frame 914. The WUR setup information may include, but is not limited to include, any of the following information: WUR beacon/synchronization information, WUR duty cycle information, WUR channel information, WUR data rate information, and/or short WUR negotiation information. The short WUR negotiation information may indicate that the STA 908 and/or the AP 906 may transmit short WUR action frame(s) over the main radio (PCR) during periods in the WUR procedure when the STA 908 temporarily switches on its PCR in order to receive updated WUR setup information.

Based on the WUR setup information, STA 908 may switch to a WUR channel 901 (or multiple WUR channels) during period 917 to monitor 916 for WUR beacon frames and/or wakeup packets transmitted from the AP 906 on the WUR channel 901. The STA 908 may not receive a signal (e.g., wakeup STA frame 918) from the AP during interval 917. The STA 908 may follow a WUR duty cycle setup, and switch periodically between WUR duty on periods and WUR duty off periods to further save power. For example, when the STA 908 is in WUR duty off mode, the STA 908 may not monitor the WUR channel 901 and save more power (e.g., by turning off the WUR in addition to the main radio being off) or the STA may monitor the WUR channel 901 but only for WUR beacon/synchronization frames (and not other frames, such as wakeup STA frames). When the STA 908 is in WUR duty on mode, the STA may monitor for any frames over the WUR channel 901.

The STA 908 may switch to the main radio to monitor main channel 405 during WUR operation, for example during time period 920, in any of the following example scenarios. In an example scenario, the STA 908 may maintain a timer for the last received packet on a WUR channel 901 during period 917. If the timer exceeds the maximum monitoring duration (e.g., as /pre-specified/negotiated), then the STA 908 may wakeup its main radio and switch to the main channel 405. In another example scenario, the STA 908 may maintain a WUR beacon count or a count of missed WUR beacons. If the number or percentage of missed WUR beacons in a time period (e.g., period 917) exceeds a parameter (e.g., MaxNumberMissedWURBeacons), then the STA 908 may turn on its main radio and monitor the main channel 405. In another example scenario, if the number or percentage of received WUR beacons is below another parameter (e.g., MinNumberReceivedBeacons) in a time period (e.g., period 917), then the STA 908 may turn on its main radio and monitor the main channel 405.

In another example scenario, the STA 908 may switch to the main radio because the STA 908 detects a signal on the WUR channel 901 with an energy level below a threshold energy level that the STA 908 cannot decode. In another example scenario, the STA 908 may switch to the main radio because the STA 908 requests (e.g., suggests) to use a higher data rate on the currently assigned WUR channel 901. The STA 908 may decide to request the higher rate because the STA 908 successfully decoded a/predetermined number of WUR packets when the STA 908 was operating below the maximum rate. In another example scenario, the STA 908 may switch to the main radio because the STA 908 requests (e.g., suggests) to use a lower rate on the currently assigned WUR channel 901. The STA 908 may decide to request the higher rate because the STA 908 detects a transmission failure due to low SNR when the STA 908 was operating above the lowest rate. In another example scenario, the STA 908 may switch to the main radio because the STA 908 may wakeup periodically to report information to the AP 906. Examples of information reported by the STA 908 to the AP 906 may include, but is not limited to include, WUR channel conditions and/or interference on a current or desired WUR channel (e.g., WUR channel 901, WUR channel 902). The AP 906 and STA 908 may negotiate the wakeup periodicity of the main radio during WUR operation during the initial WUR setup frame exchanges (e.g., exchange of WUR request frame 910, WUR response frame 912, and/or WUR signaling frame 914 during period 915).

The STA 908 may transmit a short WUR action frame 922 on a main radio on main channel 905 when the STA 908 switches on its main radio in order to update WUR setup information. In an example, the transmission of a short WUR action frame 922 may be determined and/or negotiated in a previous WUR setup frame exchange on the main channel 905 (e.g., exchange of WUR request frame 910, WUR response frame 912, and/or WUR signaling frame 914 during period 915). The short WUR frame 922 may include any of the following example information: a short WUR indication that indicates that the WUR frame 922 is a short WUR frame; the reason for current wakeup of the main radio of the STA 908 (e.g., MaxMonitoringDuration timeout, TooManyMissedWURBeacons exceeded, rate adaptation, channel switching, or channel hopping); and/or the short WUR request, which indicates that the STA requests a short WUR Action frame from the AP to change the WUR setting.

The WUR signaling frames 922, 924, and 926 transmitted between the two WUR switching or hopping intervals HI 917 and HI 932 may be simplified or short frames. For example, the WUR signaling frames 922, 924, and 926 may or may not be the same type of frame as transmitted during the initial WUR negotiation and setup phase (e.g., WUR request frame 910). For example, the WUR signaling frame 922 may be a WUR request NDP frame, which may include a field (e.g., in the signal (SIG) or SIG-A/B field) to indicate an NDP medium access control (MAC) frame, and/or a field to indicate the type of NDP frame (e.g., a value may be set to indicate a WUR request NDP frame). For example, once the NDP MAC frame field is set, the SIG field and/or SIG-A/B fields may indicate the wakeup reason.

In another example, the WUR signaling frame 922 may be a WUR response NDP frame, which may include a field (e.g., in the SIG or SIG-A/B field) to indicate an NDP MAC frame, and/or a field to indicate the type of NDP frame (e.g., a value may be set to indicate the WUR response NDP frame). For example, once the NDP MAC frame field is set, the SIG field and/or SIG-A/B fields may including any of the following information: updated WUR channel assignment (e.g., the channel index or a bitmap of channels); updated WUR primary channel (e.g., the channel index or a bitmap of channels); updated WUR rate setting (e.g., the rate index); and/or updated duty cycle setting. In another example, instead of using an NDP MAC frame format for the short WUR action frame 922, short WUR MAC frames may be designed using a QoS null frame or a MAC frame.

AP 906 may receive the short WUR frame 922 from the STA 908 and may determine to transmit a short WUR action frame 924 to the STA 908 in response, for example if a response was negotiated in previous WUR setting, and/or a reason for wakeup was indicated in the received short WUR frame 922. In an example not shown, the AP 906 may respond to short WUR action frame 922 with a full WUR action frame (i.e., not short). The short WUR action frame 924 transmitted by the AP 906 may include any of the following information (fields): a short WUR indication field that may indicate the WUR action frame 924 is a short WUR action frame; a WUR setting update field that may indicate an updated WUR channel assignment; an updated WUR primary channel field; an updated WUR rate setting field; and/or an updated duty cycle setting field.

The STA 908 may receive the short WUR action frame 924 from the AP 906 and may respond to the AP 906 with a WUR signaling frame or a short WUR action frame 926 on the main channel 905 to indicate that the STA 908 will switch back to a WUR channel (e.g., WUR channel 902) and/or to confirm the updated WUR setting based on the short WUR action frame exchange during period 920. During WUR period 932, the STA 908 may monitor 928 WUR channel 902 and receive a wakeup STA frame 930 from the AP 906.

Figure 10A:
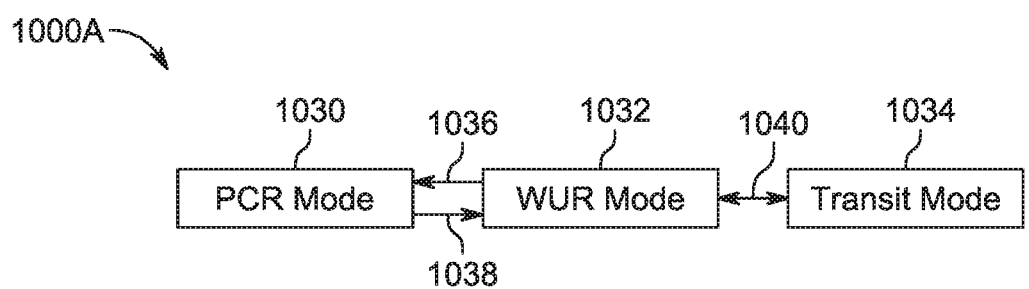
FIG. 10A shows a state diagram of an example radio operation transition procedure for a WUR-enabled STA.

Procedures may be used to update a subset of existing WUR operating parameters in a WUR-enabled STA using a WUR transit mode. In a WUR transit mode, signals may be transmitted over main radio, and the negotiated WUR parameters may remain valid until they are modified or updated, for example by a short WUR frame or other control/management frames that may be used to update one or more of the of the WUR parameters. For example, a transit mode may be used to efficiently perform channel and/or rate adaption. FIG. 10A shows a state diagram of an example radio operation transition procedure 1000A for a WUR-enabled STA. In PCR mode 1030 and transit mode 1034 the STA has the PCR turned on and the WUR turned off, and in WUR mode 1032 the STA has the PCR turned off (e.g., in sleep or doze state) and the WUR turned on. In PCR mode 1030, the STA may operate according to non-WUR 802.11 operation (e.g., according to 802.11AC or 802.11n). When the STA transitions between PCR mode 1030 and WUR mode 1032, the STA may complete full WUR parameter negotiation 1038 (from PCR 1030 mode to WUR mode 1032) and/or full WUR teardown (from WUR mode 1032 to PCR mode 1030). WUR teardown may include frame exchanges between the STA and AP over the PCR indicating that the STA is discontinuing the current WUR mode and current WUR parameters are no longer valid. When the STA transitions between WUR transit mode 1034 and WUR mode 1032, the STA may use short WUR negotiation procedures 1040, as described herein (e.g., as described in FIG. 9) such that the STA may maintain some, most or even all previously negotiated WUR parameters for the next time that the STA enters WUR mode 1032.

Figure 10B:
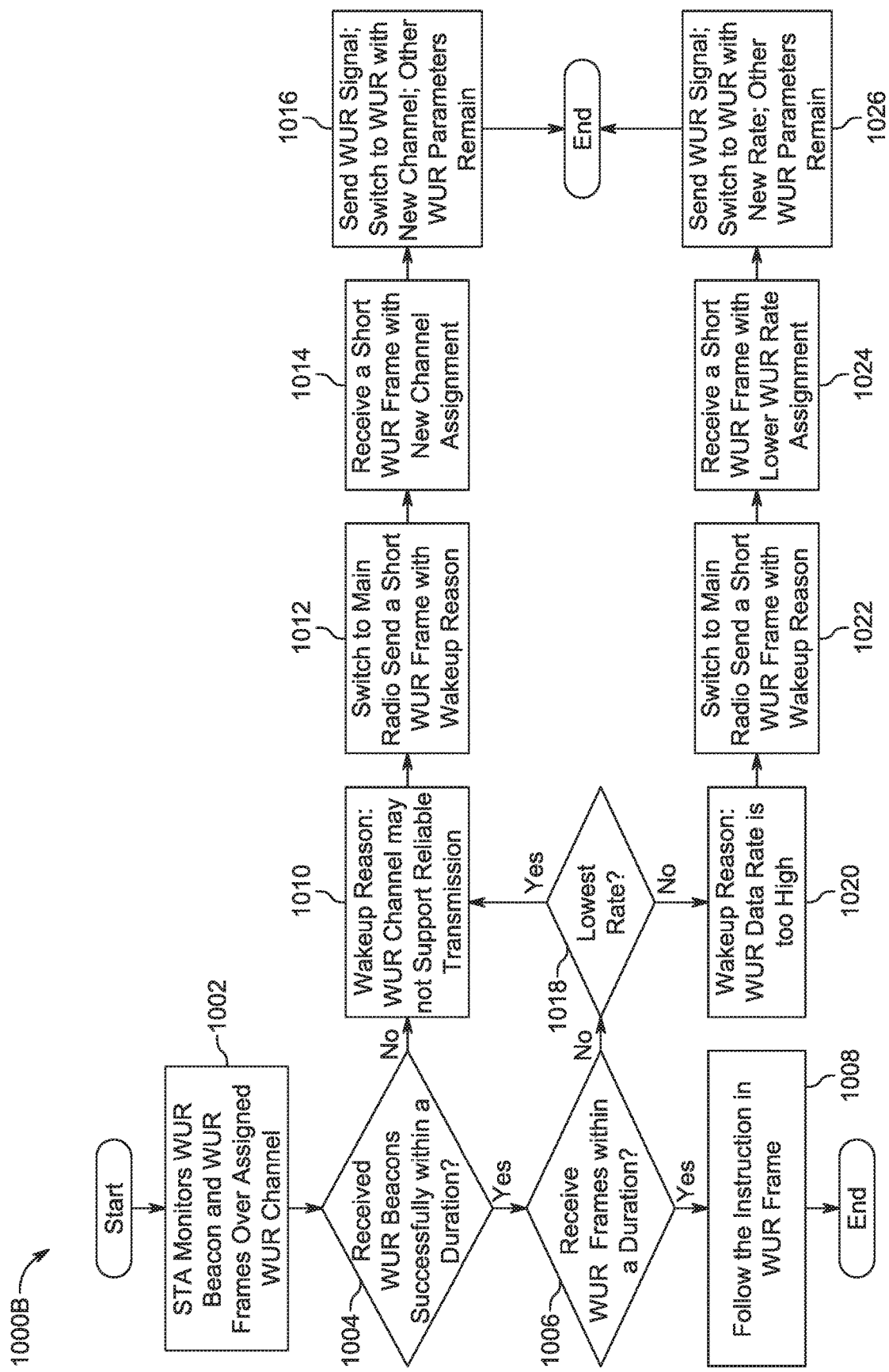
FIG. 10B is a flow diagram of an example WUR channel parameter renegotiation procedure that may be performed by a WUR-enabled STA between transitioning between WUR mode and transit mode.

FIG. 10B is a flow diagram of an example WUR channel parameter renegotiation procedure 1000B that may be performed by a WUR-enabled STA between transitioning between WUR mode and transit mode. Short WUR frames may be used for the parameter renegotiation. At 1002, the STA may monitor for WUR beacons (and/or WUR frames) over an assigned WUR channel. At 1004, the STA may determine if the STA has successfully received any WUR beacons (or WUR frames) within a duration (e.g., a time period of MaxBeaconMonitoringDuration).

If the STA has not received WUR beacons (or WUR frames) within the duration, it may be because the WUR channel condition may not support reliable transmissions, then the STA may perform any of the following actions. At 1010, the STA may switch to PCR with WUR transit mode and may set a wakeup reason to "WUR channel quality may not support reliable transmission". At 1012, the STA may wakeup/switch to the main radio (PCR) and may send to the AP a short WUR request frame that includes the wakeup reason and/or the STA may send a control/management frame that includes the wakeup reason and WUR parameters (e.g., WUR channel assignment) to be updated. At 1014, the STA may receive over the main radio a Short WUR response frame or any other control/management frame, which may include a new WUR channel assignment (e.g., the channel assignment may be indicated by a WUR channel index, PCR channel index, or channel bitmap). At 1016, the STA may send a WUR signal indicating that the STA is switching to the WUR (and dozing the main radio) according to the new WUR channel assignment, and according to any updated WUR parameters. WUR parameters that were not updated may remain the same as previously negotiated.

If the STA has successfully received a WUR beacon within the duration, then at 1006, the STA may determine if the STA has received WUR frames within a duration (e.g., MaxWURFrameMonitoringDuration). If the STA receives some WUR beacon frames but does not receive any or enough WUR frames within the duration (as determined at 1006), then at 1018, the STA may determine whether or not the STA is operating at the lowest WUR data rate. If the STA is already operating at the lower WUR rate, then it may be because the WUR channel condition cannot support reliable transmission and the STA may proceed to per 1010-1016, as described above.

If the STA is not operating at the lowest WUR rate, then at 1020 the STA may switch to PCR with WUR transit mode and set the wakeup reason to "WUR data rate is too high". At 1022, the STA may switch to the main radio and send a short WUR request frame that includes the wakeup reason, and/or the STA may send a control/management frame that includes the wakeup reason and WUR parameters to be updated. At 1024, the STA may receive a short WUR response frame or any other control/management frame, which may include a new WUR rate assignment for the STA. At 1026, the STA may send a WUR signal indicating that the STA is switching to the WUR (and dozing the main radio) according to the new WUR rate assignment, and according to any updated WUR parameters. WUR parameters that were not updated may remain the same as previously negotiated.

If at 1004 and 1006 it is determined that the STA has successfully received a sufficient number WUR beacons and WUR frames (e.g., as compared to one or more thresholds) within a certain period of time, then at 1008 the STA may follow instructions according to the received WUR frame(s) and may continue using the previously negotiated WUR parameters.

The examples above refer to example predetermined time durations MaxBeaconMonitoringDuration and MaxWURFrameMonitoringDuration. MaxBeaconMonitoringDuration may be a maximum duration that a STA monitors for beacon frames using the PCR. If no Beacon frames are detected during the MaxBeaconMonitoringDuration, the STA may switch to PCR mode or WUR transit mode. The MaxBeaconMonitoringDuration may be set according to a WUR beacon interval. For example, the MaxBeaconMonitoringDuration may be set to be M times a WUR beacon interval, where M or MaxBeaconMonitoringDuration may be a /predetermined/preconfigured integer number. In the case M or MaxBeaconMonitoringDuration is configurable, it may be signaled in a WUR action frame or other control/management frames that carry WUR parameters and are transmitted over PCR. The MaxBeaconMonitoringDuration may be determined by the STA category or STA type. For example, a table may be defined and each STA category may have its own default MaxBeaconMonitoringDuration. Thus, by STA capability exchange, the MaxBeaconMonitoringDuration may be explicitly or implicitly determined. For example, STA categories may be defined as follows (where X1, X2 and T may be preconfigured or predefined): on average, the STA may expect minimum traffic exchanges (<X1 Mbits) with an AP within T time duration; on average, the STA may expect medium traffic exchanges (>=X1 Mbits and <X2 Mbits) with an AP within T time duration; on average the STA may expect high traffic exchanges (>=X2 Mbits) with an AP within T time duration.

The MaxWURFrameMonitoringDuration may be a maximum duration that a STA may monitor for WUR frames. If no WUR frames are detected during the MaxWURFrameMonitoringDuration, the STA may switch to PCR mode or WUR transit mode. The MaxWURFrameMonitoringDuration may be a/predetermined/preconfigured number. In the case that MaxWURFrameMonitoringDuration is configurable, it may be signaled in a WUR action frame or other control/management frames that carry WUR parameters and are transmitted over PCR. The MaxWURFrameMonitoringDuration may be determined by the STA category or STA type. For example, a table may be defined and each STA category may have its own default MaxWURFrameMonitoringDuration. Thus, by STA capability exchange, the MaxWURFrameMonitoringDuration may be explicitly or implicitly determined.

In an example, one duration, "MaxMonitoringDuration" may be defined/configured that may be used as the maximum duration for WUR beacon monitoring and WUR frame monitoring. If a STA does not detect any WUR packets (beacon or WUR frames) over the MaxMonitoringDuration, then the STA may enter PCR mode or WUR transit mode. The MaxMonitoringDuration may be a/predetermined/preconfigured number. In the case that MaxMonitoringDuration is configurable, it may be signaled in a WUR action frame or other control/management frames that carry WUR parameters and are transmitted over PCR. The MaxMonitoringDuration may be determined by the STA category or STA type. For example, a table may be defined and each STA category may have its own default MaxMonitoringDuration. Thus, by STA capability exchange, the MaxMonitoringDuration may be explicitly or implicitly determined.

To simplify an 802.11ba WUR-enabled STA, 802.11ba WUR signals (e.g., transmitted by an AP) may be limited to a certain frequency band. However, the WUR signals may not be successfully demodulated at the WUR receiver in cases where the WUR receiver experiences fading due to the multipath channel. To guard against the multipath channel fading experienced on any one frequency band, a WUR receiver may monitor different frequency bands periodically. According to an example procedure for configuring the frequency bands/channels monitored by a WUR receiver in an 802.11ba WUR-enabled STA, the AP may send an indication or signaling to indicate the frequency band(s) to the main radio (PCR) of the WUR-enabled STA. The PCR of the WUR-enabled STA may configure its WUR receiver such that the WUR receiver may periodically monitor for the 802.11ba signals from the indicated frequency bands/channels. For example, an AP may transmit the WUR signals by using the negotiated frequency bands/channels periodically, and the WUR receiver may accordingly be periodically tuned to the indicated frequency bands receive the 802.11 ba signals from the indicated frequency bands.

In another example, the main radio (e.g., the 802.11ax radio) of a WUR-enabled STA may indicate the frequency bands for 802.11ba signals to an AP. For example, the frequency bands may be part of the radio capability settings, and may be transmitted to an AP based on a request from the AP. In response, the AP may indicate the frequency bands that may include 802.11ba signals to the main radio of a WUR-enabled STA before the main radio enters a sleep mode. In another example, the AP may acknowledge the indicated frequency bands for 802.11ba signals by transmitting an acknowledge signal to the main radio of the WUR-enabled STA. Once the bands for 802.11ba signals are negotiated for both STA and AP, the STA may adjust the settings of the WUR receiver (e.g., 802.11ba receiver) to scan on the indicated bands. The AP may transmit the 802.11ba signals by using the negotiated frequency bands periodically. The WUR receiver in the STA may be tune periodically to receive the signals from the indicated frequency bands. In another example, the frequency bands that may include 802.11 ba signals may be directly indicated to the WUR of the STA via 802.11ba signal through a WUR primary channel. In another example, a set of WUR channels may be defined as primary WUR frequency bands.

Figure 11:
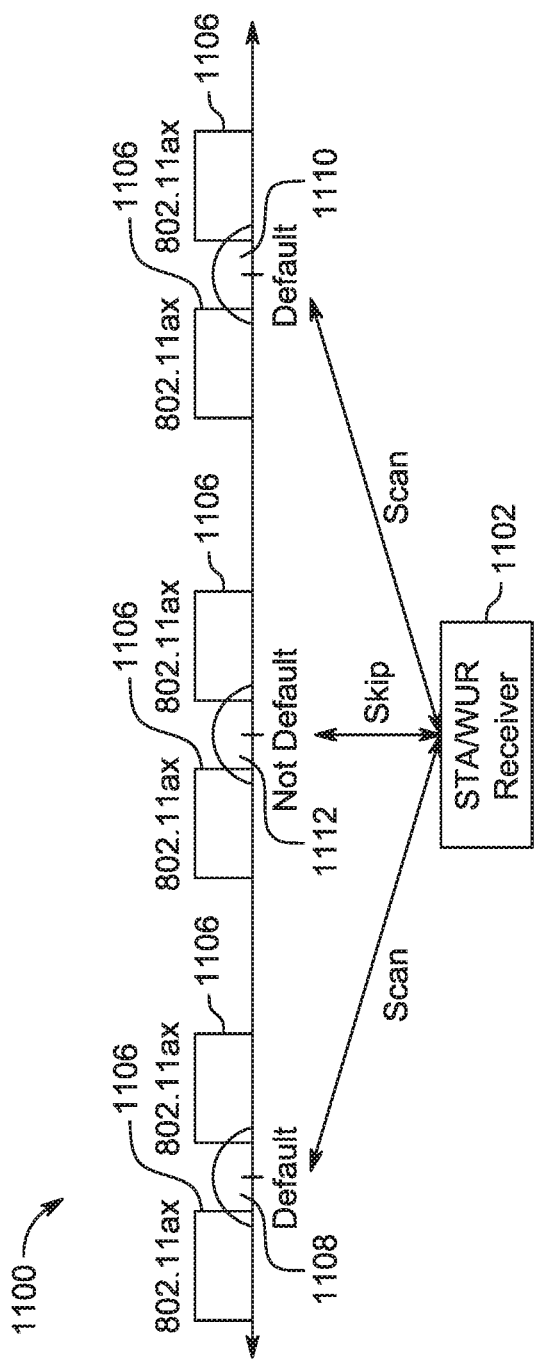
FIG. 11 is a frequency allocation diagram of an example frequency allocation for a WUR-enabled STA.

FIG. 11 is a frequency allocation diagram of an example frequency allocation 1100 for a WUR-enabled STA 1102. The frequency allocation 1100 may include an 802.11ax allocation of frequency bands 1106 to be used by the main radio (PCR) of the STA 1102. The frequency allocation 1100 may further include frequency locations/channels/bands 1108 and 1110 as the default frequency bands to be used by the WUR of STA 1102 to monitor for WUR signals. The bands 1108 and 1110 may be indicated to STA 1102, for example by an AP (not shown). The WUR of STA 1102 may scan the bands 1108 and 1110 and the STA 1102 may skip on frequency bands, such as frequency band 1112, when performing WUR frequency scans. The WUR channels for the STA 1102 may be changed such that the WUR may scan newly indicated bands (e.g., the WUR frequency bands may change to frequency bands 1108 and 1112).

Although embodiments and examples described herein consider 802.11 specific protocols, it is understood that the solutions described herein are not restricted to these scenarios and are applicable to other wireless systems as well.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A station (STA), the STA comprising:
a primary connectivity radio (PCR);
a wakeup radio (WUR); and
a processor, wherein
the PCR is configured to send, to an access point (AP), a first WUR frame including an indication of a request to enter WUR mode, WUR duty cycle information, WUR channel information recommending a WUR channel for the STA, and WUR data rate information;
the PCR is configured to receive, from the AP, in response to the first WUR frame, a second WUR frame including an indication of a first WUR channel assignment and an indication of a WUR beacon interval; and
the WUR is configured to turn on and monitor a wireless medium for WUR signals, from the AP, on a first WUR channel in accordance with the indicated first WUR channel assignment and the indicated WUR beacon interval.

2. The STA of claim 1, wherein:
the WUR and the processor are configured to determine that the first WUR channel does not support reliable transmission based on the WUR not successfully receiving a WUR frame within a first duration while operating at a lowest channel rate; and
based on a determination that the first WUR channel does not support reliable transmission:
the processor is configured to set a wakeup reason to a first reason;
the WUR is configured to turn off;
the PCR is configured to turn on and send, to the AP, a second WUR frame including at least the wakeup reason;
the PCR is configured to receive, from the AP, a third WUR frame with at least a second WUR channel assignment;
the PCR is configured to turn off; and
the WUR is configured to turn on and monitor the wireless medium for WUR signals, from the AP, on a second WUR channel according to the second WUR channel assignment.

3. The STA of claim 1, wherein the WUR is configured to monitor the wireless medium for WUR signals, from the AP, on the first WUR channel using a set of previously negotiated WUR operating parameters, wherein the first WUR channel assignment overrides a WUR channel assignment in the set of previously negotiated WUR operating parameters.

4. The STA of claim 1, wherein the first WUR channel has a narrow frequency bandwidth.

5. The STA of claim 1, wherein:
the WUR and the processor are configured to determine that a data rate of a WUR transmission over the first WUR channel is too high based on the WUR not successfully receiving a WUR frame within a first duration while operating above a lowest data rate;
based on a determination that the data rate of the WUR transmission over the first WUR channel is too high:
the processor is configured to set a wakeup reason to a second reason;
the WUR is configured to turn off;
the PCR is configured to turn on and send, to the AP, a second WUR frame including at least the wakeup reason;
the PCR is configured to receive, from the AP, a third WUR frame with at least a first WUR data rate assignment;
the PCR is configured to turn off; and
the WUR is configured to turn on and monitor the wireless medium for WUR signals, from the AP, according to the first WUR data rate assignment and a set of previously negotiated WUR operating parameters, wherein the first WUR data rate assignment overrides a WUR data rate assignment in the set of previously negotiated WUR operating parameters.

6. The STA of claim 1, wherein:
the WUR and the processor are configured to determine that the first WUR channel supports reliable transmission based on the WUR successfully receiving a beacon within a first duration and WUR frames within a second duration; and
based on a determination that the first WUR channel supports reliable transmission, the processor is configured to follow instructions in at least one received WUR frame.

7. The STA of claim 1, wherein a set of previously negotiated WUR operating parameters were previously negotiated during an exchange of WUR setup information between the STA and the AP.

8. The STA of claim 7, wherein the set of previously negotiated WUR operating parameters includes at least one of the following: a WUR channel assignment; a WUR data rate; a WUR channel hopping pattern; a WUR start time; a set of operating WUR channels; WUR beacon information; WUR synchronization information; a WUR maximum monitoring duration; a WUR station identity (ID) assigned to the STA; WUR duty cycle information; or short WUR negotiation information.

9. The STA of claim 1, wherein:
the WUR is further configured to periodically power off and power on according to a WUR duty cycle and has an active receiver power consumption below 1 milli-Watt (mW).

10. The STA of claim 1 configured as an 802.11 station (STA).

11. A method performed by a station (STA), the method comprising:
sending, using a primary connectivity radio (PCR), to an access point (AP), a first WUR frame including an indication of a request to enter WUR mode, WUR duty cycle information, WUR channel information recommending a WUR channel for the STA, and WUR data rate information;
receiving, using the PCR, from the AP, in response to the first WUR frame, a second WUR frame including an indication of a first WUR channel assignment and an indication of a WUR beacon interval; and
monitoring, using a wakeup radio (WUR), a wireless medium for WUR signals, from the AP, on a first WUR channel in accordance with the indicated first WUR channel assignment and the indicated WUR beacon interval.

12. The method of claim 11, further comprising:
determining that the first WUR channel does not support reliable transmission based on the WUR not successfully receiving a WUR frame within a first duration while operating at a lowest channel rate; and based on a determination that the first WUR channel does not support reliable transmission:
  setting a wakeup reason to a first reason;
  turning off the WUR;
  turning on the PCR;
  sending, using the PCR, to the AP, a second WUR frame including at least the wakeup reason;
  receiving, using the PCR, from the AP, a third WUR frame with at least a second WUR channel assignment;
  turning off the PCR;
  turning on the WUR; and
  using the WUR, the wireless medium for WUR signals, from the AP, on a second WUR channel according to the second WUR channel assignment.

13. The method of claim 12, wherein the monitoring, using the WUR, the wireless medium for WUR signals, from the AP, on the first WUR channel is based on a set of previously negotiated WUR operating parameters, wherein the first WUR channel assignment overrides a WUR channel assignment in the set of previously negotiated WUR operating parameters.

14. The method of claim 11, wherein the first WUR channel has a narrow frequency bandwidth.

15. The method of claim 11, further comprising:
determining that a data rate of a WUR transmission over the first WUR channel is too high based on the WUR not successfully receiving a WUR frame within a first duration while operating above a lowest data rate;
based on a determination that the data rate of the WUR transmission over the first WUR channel is too high:
  setting a wakeup reason to a second reason;
  turning off the WUR;
  turning on the PCR;
  sending, using the PCR, to the AP, a second WUR frame including at least the wakeup reason;
  receiving, using the PCR, from the AP, a third WUR frame with at least a first WUR data rate assignment;
  turning off the PCR;
  turning on the WUR; and
  monitoring the wireless medium for WUR signals, from the AP, according to the first WUR data rate assignment and a set of previously negotiated WUR operating parameters, wherein the first WUR data rate assignment overrides a WUR data rate assignment in the set of previously negotiated WUR operating parameters.

16. The method of claim 11, further comprising:
determining that the first WUR channel supports reliable transmission based on the WUR successfully receiving a beacon within a first duration and WUR frames within a second duration; and
based on a determination that the first WUR channel supports reliable transmission, following instructions in at least one received WUR frame.

17. The method of claim 11, wherein a set of previously negotiated WUR operating parameters were previously negotiated during an exchange of WUR setup information between the STA and the AP.

18. The method of claim 17, wherein the set of previously negotiated WUR operating parameters includes at least one of the following: a WUR channel assignment; a WUR data rate; a WUR channel hopping pattern; a WUR start time; a set of operating WUR channels; WUR beacon information; WUR synchronization information; a WUR maximum monitoring duration; a WUR station identity (ID) assigned to the STA; WUR duty cycle information; or short WUR negotiation information.

19. The method of claim 11, further comprising:
periodically powering off and power on the WUR according to a WUR duty cycle, wherein the WUR has an active receiver power consumption below 1 milliWatt (mW).

20. The method of claim 11, wherein the STA is configured as an 802.11 station (STA).

* * * * *